(12) United States Patent
Weber

(10) Patent No.: US 8,347,398 B1
(45) Date of Patent: Jan. 1, 2013

(54) SELECTED TEXT OBFUSCATION AND ENCRYPTION IN A LOCAL, NETWORK AND CLOUD COMPUTING ENVIRONMENT

(75) Inventor: Harold J. Weber, Centerville, MA (US)

(73) Assignee: SavvyStuff Property Trust, Centerville, MA (US)

( * ) Notice: Subject to any disclaimer, the term of this patent is extended or adjusted under 35 U.S.C. 154(b) by 74 days.

(21) Appl. No.: 12/927,076

(22) Filed: Nov. 8, 2010

Related U.S. Application Data

(63) Continuation-in-part of application No. 12/586,419, filed on Sep. 23, 2009.

(51) Int. Cl.
*G06F 7/04* (2006.01)

(52) U.S. Cl. .......................................... 726/26; 713/189

(58) Field of Classification Search .................. 713/189, 713/165, 167; 726/26; 380/52, 283; 705/64
See application file for complete search history.

(56) References Cited

U.S. PATENT DOCUMENTS

| | | | | |
|---|---|---|---|---|
| 5,517,569 A | * | 5/1996 | Clark | 380/52 |
| 6,006,328 A | * | 12/1999 | Drake | 726/23 |
| 6,049,790 A | * | 4/2000 | Rhelimi | 705/73 |
| 7,724,918 B2 | * | 5/2010 | Balakrishnan et al. | 382/100 |
| 2003/0120936 A1 | * | 6/2003 | Farris et al. | 713/189 |
| 2003/0223586 A1 | * | 12/2003 | Green et al. | 380/283 |
| 2006/0005017 A1 | * | 1/2006 | Black et al. | 713/165 |
| 2006/0031299 A1 | * | 2/2006 | Robertson | 709/206 |
| 2006/0075228 A1 | * | 4/2006 | Black et al. | 713/167 |
| 2009/0319782 A1 | * | 12/2009 | Lee | 713/156 |
| 2012/0079281 A1 | * | 3/2012 | Lowenstein et al. | 713/189 |
| 2012/0079282 A1 | * | 3/2012 | Lowenstein et al. | 713/189 |

* cited by examiner

*Primary Examiner* — Samson Lemma

(57) ABSTRACT

A keyboarded a mix of private and public text composing a source-text document is submitted through an encryption adapter intersituated in a data signal link between the keyboard and a computer system. A user selects and obfuscates the private text character portions with surrogate cloak characters in concurrent alternation with direct entry of the public text characters. A resultant protected document's data signal is safeguarded for editing and data storage without revelation of the private text content. The protected document is sufficiently secure for submission into a cloud computing environment and is immune to key-entry tracking malware. Clandestine hacking of residual data remaining in the computer firmware is negated in interpretative value by enabling the user's selective obfuscation of the source-text document's private text character content with surrogate cloak characters prior to entry into the computer system's keyboard input port.

20 Claims, 32 Drawing Sheets

Typical Microsoft Set 2 - SCAN CODE for Printable Character Assignments

KEYBOARD SCANCODE in ALPHA-HEXADECIMAL ORDER — 6F11

```
A   B   C   D   E   F   G   H   I   J   K   L   M
1C  32  21  23  24  2B  34  33  43  3B  42  4B  3A

N   O   P   Q   R   S   T   U   V   W   X   Y   Z
31  44  4D  15  2D  1B  2C  3C  2A  1D  22  35  1A
```

6F2 → NUMERALS & PUNCTUATION

```
~   !   @   #   $   %   ^   &   *   (   )
`   1   2   3   4   5   6   7   8   9   0
0E  16  1E  26  25  2E  36  3D  3E  46  45
                    6F3            6F4

+   |   {   }   ?   <   >
=   \   [   ]   /   ,   .
55  4E  5D  54  5B  4A  41  49
6F6
```

Rshift = 59 ← 6F5
Lshift = 12
spacebar = 29
caps-lock = 58

KEYPAD NUMBER KEYS

```
1   2   3   4   5   6   7   8   9   0
69  72  7A  6B  73  74  6C  75  7D  70
``` backspace = 66   key-release = F0

Fig. 6

GROUP CK1/C1:              CK1 = DOG = 4-15-7
  M =   4+18 = 22 = K = 22-  4 = 18 = M
  A = 15+17 = 32 = X = 32-15 = 17 = A
  R =   7+25 = 32 = X = 32-  7 = 25 = R
  Y =   4+14 = 18 = M = 18-  4 = 14 = Y

A =   4+17 = 21 = T = 21-  4 = 17 = A
  D = 15+15 = 30 = V = 30-15 = 15 = D
  A =   7+17 = 24 = B = 24-  7 = 17 = A
  M =   4+18 = 22 = K = 22-  4 = 18 = M

GROUP CK2/C1:              CK2 = CAT = 3-1-20
  P =   3+11 = 14 = Y = 14-  3 = 11 = P
  H =   1+13 = 14 = Y = 14-  1 = 13 = H
  O = 20+20 = 40 = Y = 40-20 = 20 = O
  E =   3+ 9 = 12 = S = 12-  3 =  9 = E
  N =   1+ 5 =  6 = X =  6-  1 =  5 = N
  I = 20+10 = 30 = V = 30-20 = 10 = I
  X =   3+ 6 =  9 = E =  9-  3 =  6 = X

```
GROUP CK1/C1:            CK1 =  DOG  =  4-15-7
  M =   4+18 = 22 = K = 22- 4 =  5 = M
  A = 15+17 = 32 = X = 32-15 = 17 = A
  R =   7+25 = 32 = X = 32- 7 = 25 = R
  Y =   4+14 = 18 = M = 18- 4 = 14 = Y

A =   4+17 = 21 = T = 21- 4 = 17 = A
  D = 15+15 = 30 = V = 30-15 = 15 = D
  A =   7+17 = 24 = B = 24- 7 = 17 = A
  M =   4+18 = 22 = K = 22- 4 = 18 = M

GROUP CK2/C1:            CK2 =  CAT  =  3-1-20
  P =   3+11 = 14 = Y = 14- 3 = 11 = P
  H =   1+13 = 14 = Y = 14- 1 = 13 = H
  O = 20+20 = 40 = Y = 40-20 = 20 = O
  E =   3+ 9 = 12 = S = 12- 3 =  9 = E
  N =   1+ 5 =  6 = X =  6- 1 =  5 = N
  I = 20+10 = 30 = V = 30-20 = 10 = I
  X =   3+ 6 =  9 = E =  9- 3 =  6 = X

GROUP CK3/C1:            CK3 =  BUG  =  2-21-7
  T =   2+21 = 23 = Q = 23- 2 = 21 = T
  U = 21+26 = 47 = T = 47-21 = 26 = U
  E =   7+ 9 = 16 = W = 16- 7 =  9 = E
  S =   2+12 = 14 = Y = 14- 2 = 12 = S
  D = 21+15 = 36 = I = 36-21 = 15 = D
  A =   7+17 = 24 = B = 24- 7 = 17 = A
  Y =   2+14 = 16 = W = 16- 2 = 14 = Y
```

CIPHER-KEY CK1 = DOG = 4-15-7    ← 13-11

← 13-01

13-21 →       13-22 →       13-23 →
MARY and ADAM will be flying to PHOENIX on TUESDAY 13-31 →       13-32 →       13-33 →
CWGA and DINJ will be flying to VWUNGBU on EIGOBIQ
CK1/C2  CK1/C2           CK1/C3           CK1/C4

FIG. 13

```
                    CIPHERKEY CK1 = DOG = 4-15-7
GROUP CK1/C2:
  M =   4+ 5 =  9 = C =  9- 4 =  5 = M
  A = 15+14 = 29 = W = 29-15 = 14 = A
  R =   7+ 4 = 11 = G = 11- 7 =  4 = R
  Y =   4+10 = 14 = A = 14- 4 = 10 = Y

A =   4+14 = 18 = D = 18- 4 = 14 = A
  D = 15+18 = 33 = I = 33-15 = 18 = D
  A =   7+14 = 21 = N = 21- 7 = 14 = A
  M =   4+ 5 =  9 = J =  9- 4 =  5 = M

GROUP CK1/C3:
  P =   4+12 = 16 = V = 16- 4 = 12 = P
  H = 15+ 6 = 21 = W = 21-15 =  6 = H
  O =   7+20 = 27 = U = 27- 7 = 20 = O
  E =   4+18 = 22 = N = 22- 4 = 18 = E
  N = 15+22 = 37 = G = 37-15 = 22 = N
  I =   7+24 = 31 = B = 31- 7 = 24 = I
  X =   4+23 = 27 = U = 27- 4 = 23 = X

GROUP CK1/C4:
  T =   4+19 = 23 = E = 23- 4 = 19 = T
  U = 15+ 2 = 17 = I = 17-15 =  2 = U
  E =   7+23 = 30 = G = 30- 7 = 23 = E
  S =   4+22 = 26 = O = 26- 4 = 22 = S
  D = 15+14 = 29 = B = 29-15 = 14 = D
  A =   7+10 = 17 = I = 17- 7 = 10 = A
  Y =   4+ 9 = 13 = Q = 13- 4 =  9 = Y
```

FIG. 14

CIPHER-KEY CK1 = DOG = 4-15-7

CODE-LIST C2 SCANCODE CONVERSION

```
M = 3Ah    >>>   C = 21h    F0h,21h
A = 1Ch    >>>   W = 1Dh    F0h,1Dh
R = 2Dh    >>>   G = 34h    F0h,34h
Y = 35h    >>>   A = 1Ch    F0h,1Ch

A = 1Ch    >>>   D = 23h    F0h,23h
D = 23h    >>>   I = 43h    F0h,43h
A = 1Ch    >>>   N = 31h    F0h,31h
M = 3Ah    >>>   J = 3Bh    F0h,3Bh
```

CODE-LIST C3 SCANCODE CONVERSION

```
P = 4Dh    >>>   V = 2Ah    F0h,2Ah
H = 33h    >>>   W = 1Dh    F0h,1Dh
O = 44h    >>>   U = 3Ch    F0h,3Ch
E = 24h    >>>   N = 31h    F0h,31h
N = 31h    >>>   G = 34h    F0h,34h
I = 43h    >>>   B = 32h    F0h,32h
X = 22h    >>>   U = 3Ch    F0h,3Ch
```

CODE-LIST C4 SCANCODE CONVERSION

MARY and ADAM will be flying to PHOENIX on TUESDAY
  └─16-21↗                        └─16-22↗    └─16-23↗
ENCRYPTS AS:
  └─16-31↗                        └─16-32↗    └─16-33↗
CWGA and DINJ will be flying to VWUNGBU on EIGOBIQ

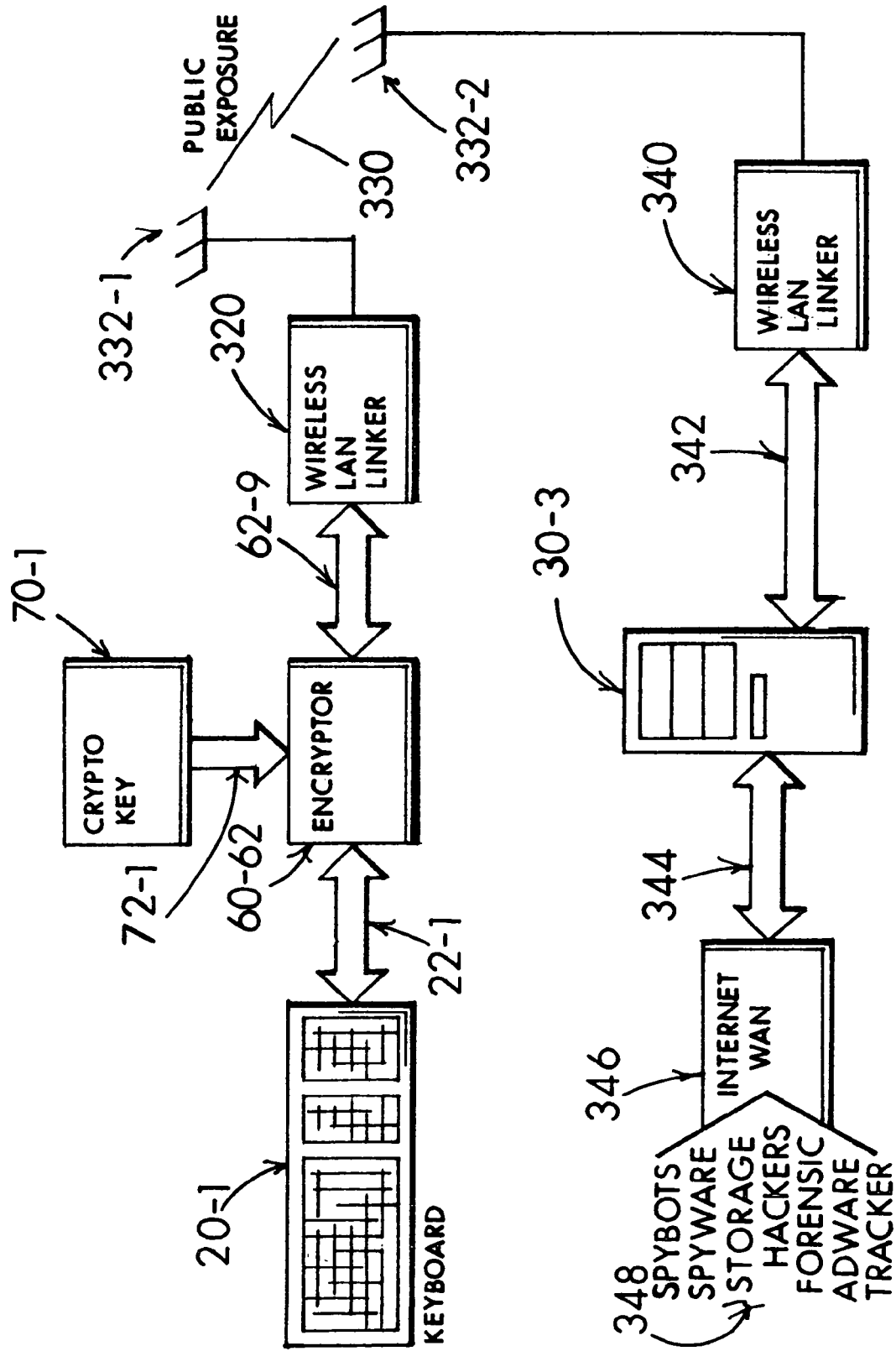

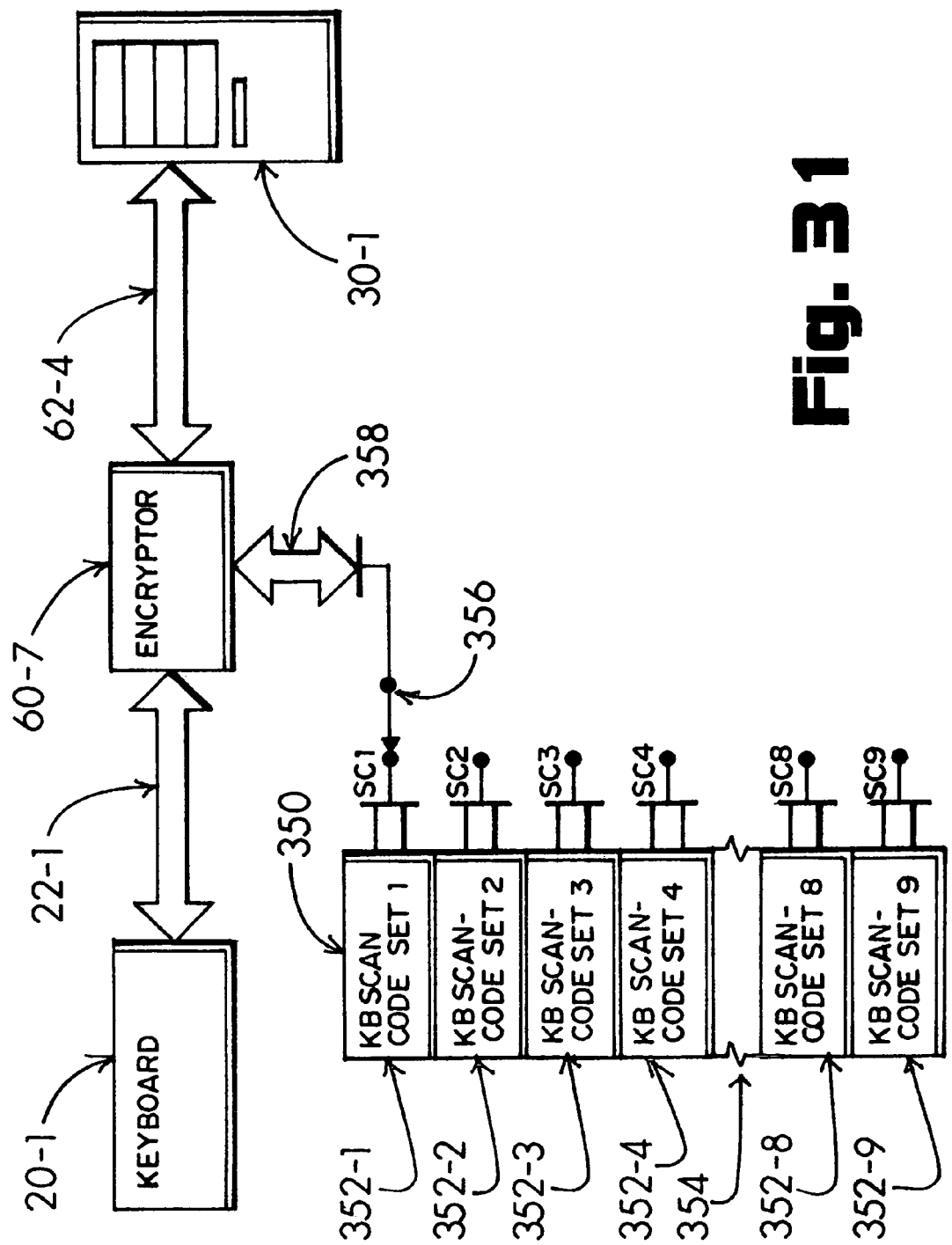

SELECTED TEXT OBFUSCATION AND ENCRYPTION IN A LOCAL, NETWORK AND CLOUD COMPUTING ENVIRONMENT

CROSS-REFERENCE TO RELATED APPLICATIONS

Related U.S. Application Data

This application is a Continuation-In-Part of application Ser. No. 12/586,419, filed Sep. 23, 2009 for "Selected Text Obfuscation and Encryption in a Portable Computer Environment."

FIELD OF INVENTION

This invention relates to a dynamic in situ cloaking (or masking) of portions of private text as it is typed into an unsecure local or networked "public" computer, or a computer running software for interface with a cloud computing environment. Public text is directly entered while the private text is selectively cloaked by obfuscation with ostensibly random discernible characters. Attendant privacy-cloaking of the selected text portions is achieved by encrypting the keyboard's scan code data signal ordinarily flowing between the text-entry keyboard and the computer so as to absolutely exclude private unprotected textual scan-code data from entering the unsecure computer where otherwise it may be inadvertently stored, accessed by internet inquiries or violated by key-entry tracking beacons. The invention intends to provide a strategy that defends against evolving malware threats, particularly as it affects keyboarded private information. The invention protects casual private text, as well as intentionally confidential and secret text, from admission as raw keyboard scan-code data into the unsecure computer hardware where it may secreted or temporarily retained in an indefinite number of memory, register and storage medium locations—usually occurring in a manner transparent to the user. Furthermore the invention intends to restrict a sending of private information into the off-site cloud computing environment where it is susceptible to interception during it's transmission or through off-site files penetration by clandestine efforts.

Synopsis

In this invention's operating scenario, a mixed content document ordinarily consists of an aggregation of public text and private (i.e. secret, confidential, "eyes only," etc.) text. The user may routinely type the mixed-content document into the keyboard of the unsecure computer where the private text may be unwittingly stored or temporarily held as residual data during "processing" by an application, although the user may innocently believe that he/she has subsequently deleted or erased the "content," it often still remains accessible by savvy technicians. Unfortunately and often unbeknown to the user, the residual text data may be simply retained in the hardware's memory as ghost data. It is well known that latent image data may be inadvertently or intently retrieved by another party (e.g., a hacker) not having authority to view the residual or stored data that reveals the private text. This viewing of the private text by another unauthorized party may either be an innocent "accident," or maliciously achieved through a clandestine reaping or "scraping" of the residual text data.

In order to avert this sort of problem, this invention intends that the keyboard scan-code data signal produced by typing the private text into the keyboard is intendedly cloaked prior-to submission into the software controlled data-processing hardware of the unsecure computer. On the other hand, the public text content surrounding the private text portions of the mixed content document are admitted to the computer without encryption (e.g., maintained as openly readable "plain language" text). The important reasoning behind enabling this mixed content entry of discernible text containing cloaked private text portions and plain text portions is to allow retention of a protected document's overall formatting style and general appearance for layperson viewing, editing and general handling. In other words, the protected document as submitted to the computer renders to the layperson as surely as if it were a mixed content document merely having the private portions "X'd" out or "blocked-out" by over-marking.

The resulting selectively-protected document, as submitted into the unsecure computer, denies possible residual retention or misappropriation of any meaningful private text in or from the unsecure computer, since the private text's keyboard originated scan-code data signal is particularly cloaked prior to ever being submitted into the computer. It also cloaks the keyboard entry of specifically private text submitted into an "off-site" software environment known as "cloud computing." In the cloud environment the entered data may be openly sent as a virtual data signal to a central server elsewhere in the internet for word processing and other data handling services. This invention enables the user of "virtual desktop" computer based application services utilizing a shared server, or a centralized server cluster, to benefit from the virtual desktop's access portability and convenience. It still absolutely safeguards the most private text portions of the user's document handling by the shared server's overall program capability including extensive data processing, data storage and application servicing. More importantly it protects privacy relative with the shared server's interconnection with any number of servers situated elsewhere and reached through the capabilities of intranet and internet collaboration.

A principal aspect of this invention is it's unique capability for particularly enciphering the scan-code data signal produced by an ordinary keyboard "on the fly" as a document is keyboarded. This is accomplished through in situ switching back and forth between plain text allowance and private text cloaking as an aggregation of public and private text is typed-into the keyboard. In this context, the keyboarded information becomes a succession of plain-text and discernible character cloaking text data when it couples with the keyboard signal input port of the unsecure computer. Embellishments to this basic protection includes segregating the text characters and numerical characters to be supplanted by like characters, thereby maintaining the formatted appearance of the protected document's style in a more representative and editable form.

BACKGROUND OVERVIEW

In the context of this invention, a mixed content document includes any document where private text content is randomly intermixed with public text content. A practical example would be a business letter or similar document having client names, appointment schedules or travel information entered as the private content text, surrounded by formatted public text including for example salutational niceties and supportive explanatory or dissertational matter. The common result is an aggregation of private and public text.

Computers (e.g., office computers, desktop computers, portable computers, laptop computers, notebook computers, tablet computers, notepad computers, home computers, data terminals, "system access-points," etc.) are often used to run applications that may initially write, format and later perhaps edit mixed content documents. Ordinary computers are generally not considered to be sufficiently secure to prepare mixed content documents which include the private text content. As is well known, unsecure computers may readily compromise the security of documents typed into their processing functions due to residual retention of the entered keyboard data as a latent image in memory, storage devices and registers. It is also well known that ordinary erase or delete commands do little to thwart this inherent security weakness because the entered private data may still remain in residual retention and may be "hacked-out" or retrieved by an ever-increasing variety of methods.

It is concern over the possibility of retrieving residual private text data inadvertently left behind by the casual user of an unsecure computer that serves to highlight the advantage offered by this invention. In other words, when the user must enter private components of a mixed content document information into an unsecured computer, this invention enables encryption of the private text matter independent from the computer's hardware and meanwhile the public text portions may be openly submitted without obfuscation.

Keyboard Insecurity

A widespread influx of intrusive computer-entry tracking tools which are known to reside as parasites in many if not most unsecured computers has become the bane of trusting private information to "just any old computer," whether in the office or at home. Some illicit tracking software is so "functionally transparent" that the user remains unaware that his/her every keystroke is being monitored, stored as a "cookie" or even sent elsewhere for dissemination. Of course, residing as a transparent parasite is the tracking software's inherent strength. Although many of the trackers are quietly installed ostensibly for "market research" by lofty and trusted companies such as Google, Microsoft, Quantcast, Comcast, MSN, Yahoo!, Dictionary.com and even the staid The Wall Street Journal there are probably just as many if not more obscure furtive trackers operated for nefarious purposes. Obviously, if a user's private text is to be assuredly kept absolutely private, the keyboard scan-code data signal representing a usual plain-language data exchange between the keyboard's keystroke-entry made by the user and the computer must be "spoiled" by a virtual in situ masking or cloaking of the keystroke character's scan-code entries. One of the principal revelations of this invention is to intercede and privatize the keyboard scan-code data signal representing individual keystroke entries before it enters the data port of an unsecured computer. This capability for intendedly cloaking the privacy of confidential portions of the keyboard's scan-code data signal flow while the public portions remain uncloaked remarkably benefits users of the "virtual desktop" computer in the cloud computing environment, because sensitive information is barred from ever leaving the users physical site.

A good example of utilizing this invention to avoid private data interception when submitting text matter into an unsecured computer might include the filling out of form data (e.g., an insurance or credit application, etc.) while being prepared for or sent to the user's office, or uploaded into cloud computing data files. In such a setting, private data such as names, social security information, telephone numbers, address information and the like are guarded by encryption while relatively innocuous supportive information, such as expansive responses to questions (viz, a description of an accident, purpose of a loan, etc.), is concurrently entered as public (e.g., unencrypted) text data. Clearly, cloaking such private data before allowing it to flow forth into an off-site environment of unknown security can go a long way to safeguarding private data files from being reaped or "scraped" for information that might lead to identity theft and other unauthorized or criminal purposes.

This invention's revelations also enables the user to protect private data intermixed with public data which might be stored on a removable media, such as a compact disc, thumb-drive, floppy disk or flash memory. As a result, the mixed content of the user's textual data may be confidentially transported between computers with a minimum of risk for covert revelation of the private text information even if the storage medium becomes lost or stolen.

In earlier art shown in U.S. Pat. Nos. 5,517,569 and 5,815,577 inventor Dereck D. Clark teaches using a PIN entry device 214 for example, interposed between a keyboard 206 and a computer 204. In essence this device utilizes software in the computer to prompt entering the PIN number to activate the encryption module 214 such as a point-of-sale device, with all the successive entries into the keyboard being encrypted upon entering the computer 204. Clark does not anticipate switching back and forth between private text and public text portions of any keyboard entries, because to do so would entail awaiting an on-screen 202 prompt and re-entry of a PIN number. This earlier art therefore does not anticipate, discuss nor provide for frequent "on-the-fly" changeovers between private text and public text entries, which is the essence of the present invention. In fact the Clark teaching is especially silent regarding any provision for repetative switching back and forth between encryption and non-encryption. Under Clark such repeated alternation requires utilizing a cumbersome entry of the PIN number or its equivalent upon an occurrence of each encryption event involving a private text portion which might be sandwiched between public text portions. Clark's teaching is obviously intended and best suited for encryption of an entire keyboarding sequence involving a substantial portion of a full document, or for merely singularly submitting the PIN number and perhaps a few other private data entries.

PROBLEM SOLVED BY INVENTION

A user may have occasion to type a letter or advisory on the keyboard of an unsecured computer when the keyboarded entries contain private (e.g., confidential or secret) text information in addition to a surround of public dissertational text. A practical example is a letter advising attendees of a meeting time and venue while the guest speaker's name and other privileged details are to be protected. A classic example of a public text portion might include salutations, directions to the venue, parking facilities, lodging suggestions and other general-interest advisory material.

In such a setting it is a high-risk proposition for the user to enter the private text into the usual computer interface offering an unknown extent of security protection. On the other hand, by intersituating this invention between the keyboard and the unsecure computer, the private text is absolutely masked by encryption of the keyboard data stream while the public text is openly typed into the unsecured computer. This allows the user to edit the format or layout of the letter without revealing the private text, or chancing that the private text is inadvertently "left-behind" in the unsecured computer as residual, albeit recoverable, data in the computer's memory, register or storage provisions. For example, routinely editing a change in venue details or time is handled as public information, while the private information is kept cloaked by encryption.

Another phenomenon which plagues unsecured computers is the likelihood that malware may be present that can act as a violative tracker of keystroke entry data. This stolen data may be sent elsewhere or stored in public storage portions of the unsecured computer. It is well known in the art that malware often offers a malicious threat to the user by it's virulent ability to steal the keystroke entry data and make the data represented by the keystroke entries public, or at least available to unauthorized users. It is the essential essence of this invention to help the user defend against evolving malware threats by denying entry of private-data entry keystrokes as keyboard data linked into the unsecured computer. Instead, the user's private text is keyboarded concurrent with selective real-time encryption that makes the malware's access to the keyboard scan-code data signal essentially worthless as it admits into the "keyboard input" of the unsecured computer. It is this strategy to selectively encrypt the private text prior to committing the keyboard data signal to the unsecured computer's keyboard input port that sets this invention apart from known art. At the same time, the public information is ordinarily keyboarded directly into the keyboard input port of the unsecured computer for routine editing, formatting or printing.

When a mixed content document is prepared, say as an email document, for sending over the intranet or internet, e.g., either within the confines of an organization or openly via the world wide web, the user is assured that the private text content is safely protected while the overall document which includes public text matter is sent in a form that is readily discernible by the recipient although the private text selections appear securely masked by cloaking characters. As a result, a document such as a letter safely contains a blending of very private text together with public text dissertations and the resultant mixed content document may be prepared on an unsecured computer and be openly sent over a public network to a recipient user's unsecured computer. The recipient user may later recover the mixed content document on a known-secure computer with the original private content and public content restored as a replication of it's original mixed-content readable document format.

Preparing business or personal letters is another area of concern, where leaking of private text data may occur due to "cookies," "beacons" and other trackers which have been secreted on the unsecured computer. Keystroke trackers remain as a concern while preparing a letter's private information, such as a guest's name, a phone number or other sensitive information that may ordinarily be included. A letter may be necessarily read by numerous persons and cloaking the private text by encryption allows the casual reader to openly garner the overall gist of a letter while not revealing the absolute details. For example, the generalization of a project description or a meeting summary may be revealed, while explicit details such as attendees, revealed goals or monetary values may be safeguarded.

Keystroke trackers don't actually sense the physical keystroke, but rather they reap the raw keyboard scan-code data linked between the keyboard and the computer at the computer end. This invention recognizes the import of spoiling the keyboard scan-code data signal when private or sensitive text matter is being keyboarded by the user so it becomes unrecognizable by an unauthorized sleuth.

A "client desktop" computer in a contemporary office often operates in the cloud computing environment as a "virtual desktop entry point" that links with servers located in a distant or "off-site" data center. Obviously a potential for covert or accidental access to private text data while rarely violated, is ever-present. Whether such an unauthorized data leak is real or perceived still leaves the possibility and uncertainty as a viable concern for a cautious user or security officer.

Computers utilized as "hosted virtual desktops" are presently assuming ever-increasing acceptance in the workplace. In this "cloud computing" environment, a thin client computer (e.g., usually having a minimum of non-essential resources) links with a centralized server (usually part of a server cluster or server farm) which may not be under the control or authority of the user. In other words, the user utilizes the client computer as data terminus for keyboarding data into and displaying data obtained from the central server. Obviously the user may have realistic concerns for protecting his/her private text data. This capability for achieving an user-controlled safeguarding of private text may now be readily attained by utilizing this invention's teaching to cloak or mask the private portions of the keyboard's scan-code data flow.

A particular cloud-computing environment is available as "Google Apps" in which "Google Docs" operates as a web-based word processor, spreadsheet, presentation, form and data storage service. Obviously there is some hesitation for a cautious user to submit private, confidential information to such a quasi-public operating environment. By cloaking the keyboard's scan-code prior to linking it to the unsecure "virtual desktop" computer's keyboard input port, the user has thwarted any reasonable likelihood that the raw private text will appear in the cloud-computing operating environment.

When the computer is used as a "thin-client computer," operating in a "virtual desktop" mode (in effect functioning as a terminal) in a client-server environment, the cloaking of keyboarded private text information prior to linking into the thin-client computer is preferable if not vital to prevent the private text from inadvertently passing into and circulating in the overall network afforded by the cloud-computing environment. If another thin-client computer operating in the same client-server cloud environment were to intentionally or inadvertently intercept the user's private text, the intercept would yield little more than a textual aggregation of encrypted cloaking characters mixed in with public text.

SUMMARY OF INVENTION

A mixed content text document may have private text information included within a surround of non-sensitive public text information. Private text, by definition, is any sensitive textual information that the user or writer does not want to be exposed to persons lacking a "need to know" authority. Private text often includes information ranging from merely "restricted" to the highest "secret" or "eyes only" levels of confidentiality.

On the other hand, it is advantageous to have some non-sensitive document content, such as portions of a letter or work-order, to be readable by a wide range of individuals having varying degrees of need-to-know authority ranging from none to the highest levels. In the past it was common-practice that the private text may be "crossed out" so as to appear hidden and unreadable by an intruder or unauthorized recipient, although the public text may remain perfectly clear and understandable as it pertains to matters outside of the exclusions of the hidden text portions. For example, a work order may include a description of a task to be accomplished, while the identity of sources, statements regarding costs and names of key individuals are masked or cloaked by selective encryption.

A further offering of this invention is a capability for the selective encryption to have a recipient-specific decryption capability. That is to say, one private portion may be deciphered for meaning by recipient-A, while another portion may be decipherable by recipient-B. In a practical sense such as for a work order, this might be that the identity of sources or "outside providers" be specifically provided to a job's foreman, while the statements of cost or names of key consultants be accessible to the job's overall supervisor, plant engineer or similarly authorized entity. As a result, a document may be prepared, with variously encrypted exclusions, so that "one document fits all" satisfies a multitude of user applications.

In a similar way, for example in a business letter, certain private portions are cloaked at the highest level exclusively for the addressed recipient while other less-private portions may be cloaked at one or more intermediate levels for access and readability by the recipient's assistant or secretary and others as needed to benefit efficient support and planning, say for the occasion of receiving an important visitor, scheduling travel or planning support for an event without revealing the most private details such as the explicit name of the visitor. Other insensitive "boiler-plate" text may remain plainly unmasked, thereby readable by support personnel for purpose of appropriately filing, distributing and gaining rudimentary knowledge for planning the occasion.

In the routine exchange of these and similar types of text-based documents, privacy is absolutely safeguarded when uncontrolled public exposure may occur. Such unintended exposure might be encountered by using an unsecured computer for text data entry or by sending the resultant text entry data over an inherently public intranet or interne system.

The essence of this invention is to enable the user to type text into an unsecured computer through a conventional keyboard, or else using a virtual keyboard presented on a touch-responsive screen. For example, a mixed content document such as a letter may be initially typed-into a keyboard to produce a keyboard scan-code data signal which is ordinarily linked with a keyboard scan-code data signal input port (e.g., keyboard input port) on the computer or terminal. It is the novelty of this invention to enable the user to select and cloak only the private text scan-code portions while the public text scan-code portions openly link to the computer without masking. Furthermore, it is the unique capability for singularly imparting the selective cloaking of the keyboard scan-code data signal so it is selectively limited to the private text portions in situ and "on the fly" while otherwise the keyboard scan-code data signal representing the public text continues to flow openly without masking.

Since the keyboard's keystrokes are encrypted by the invention prior to linking into the computer's keyboard data signal input port, it becomes a futile effort for clandestine keystroke tracking malware such as "Beacons" or "Web-Bugs" because all that is likely to be tracked is a meaningless data stream of cloaked scan-code data signal characters. Furthermore, a keyboarded scan-code data signal which is inputted to the computer in conjunction with the invention is masked with cloaking characters and thereby any residual file data inadvertently retained in software cookies or in the computer hardware as residual data is essentially spoiled and relatively meaningless mumbo jumbo insofar as yielding to malicious retrieval efforts by hackers, scrapers or virulent malware.

Manual Selection

To attain the selective cloaking of the private text portions, the user toggles a switch to functionally and assuredly activate encryption exclusively during the private text entry and subsequently disable the enciphering during the public text entry. In other words, the user may switch back and forth between cloaking the private text portions and passing uncloaked public text for directly linking with the computer's keyboard input port.

Key Command Selection

A selection between cloaking of the private text portions and allowing unencumbered flow of the public text may be controlled by keyboard commands. In this mode a combination of uniquely assigned keystroke events (viz., "{0[") are detected and utilized to activate and maintain the keyboard scan-code encryption or enciphering for character cloaking during private text entry, while a complementary keystroke event combination (viz., "]0}") releases the encryption and allows the public text to flow straight through with impunity.

It shall be realized that either one of the manual selection or key command selection events affords a dynamic real-time in-line character cloaking provision. Either way a choice is provided for the user to quickly opt between enciphered-text cloaking and plain-text data flow on a real-time basis.

In the embodied teaching of this invention, it is configured as a free-standing portable apparatus intersituated and thereby interconnected in series with the keyboard scan-code signal cable that usually couples between the keyboard scan-code data signal output and the keyboard data signal input port of the computer. This allows utilization with virtually any common keyboard the user may prefer. It is the preferred application of this invention to produce enciphering of the private text portions of the keyboard's scan-code data signal as it passes between the keyboard output port and the computer's keyboard input port.

Exemplar 1

By way of example, when a name such as "Adam" is typed into the keyboard, the resulting scan-code sequence ordinarily produces the following hexadecimal data:

| KEYPRESS | | KEY-RELEASE | |
| --- | --- | --- | --- |
| shift 12h | — | | (Note 1) |
| A | 1Ch | F0h | 1Ch |
| unshift | — | F0h | 12h |
| d | 23h | F0h | 23h |
| a | 1Ch | F0h | 1Ch |
| m | 3Ah | F0h | 3Ah |

NOTE 1:
Shift code may also be 58h or 59h. Shift and unshift denotes occurrence of an upper-case character "A".

NOTE 1: Shift code may also be 58h or 59h. Shift and unshift denotes occurrence of an upper-case character "A".

The raw serial scan-code sequence ordinarily delivered from the keyboard becomes:

12h 1Ch F0h 1Ch F0h 12h 23h F0h 23h 1Ch F0h 1Ch 3Ah F0h 3Ah . . . And, by encryption (discussed later) using "dog" as the cipher-key or crypto-key and a linear alphabetical listing (e.g., ABCD . . . etc.) as the code-base, the user may for example publicly render "Adam" as alternate cloaking cipher-characters (viz, on the computer screen or printer) positive-offset by the crypto-key, e.g., d=4, o=15, g=7, to appear as:

E s h q where:
A=1=1+4=5=E
d=4=4+15=19=s
a=1=1+7=8=h
m=13=13+4=17=q represented by a hexadecimal data signal showing of
E s h q=24h 1Bh 33h 15h
therefrom resulting in a secured scan-code data stream of:

12h 24h F0h 24h F0h 12h 1Bh F0h 1Bh 33h F0h 33h 15h F0h 15h.

By subsequently entering the cloaking cipher-characters "Eshq" through the keyboard, in combination with using a negative numerical cipher-offset value of 4-15-7 derived from the encryption key "dog" and the same linear code listing, the original name "Adam" may be subsequently decrypted and privately recovered. In other words, the masked entry "Eshq" may be stored, distributed, printed, read (by the user and others) and later typed into the same or another keyboard that, with the benefit of this invention and the encryption key "dog" (equating to the numerical cipher-offset value: 4-15-7) the cloaked characters "Eshq" masking the name "Adam" will be fully decrypted and revealed. It is important to note that the non-printing keyboard data signals (e.g., CR, LF, etc.) are preferably not encrypted thereby maintaining the original text formatting layout in the resultant encrypted text format construction.

Exemplar 2

Cloaking the characters of the private text portions of a mixed content document is dividable into two or more cipher-character cloaking levels. This EXEMPLAR 2 demonstrates selective encoding when private text information is necessarily included amongst a stream of mixed public and private text. For example, the unprotected mixed-content text may read:

"The court's judge refused to approve the Citibank settlement with Johnson over the mortgage problem."

The underlined private text is preferably secured in situ, while typing, by this invention to present the following alternate partially cloaked text to the computer's keyboard input:

"The court's judge refused to approve the Gxamqhrz settlement with Mpbqtiq over the mortgage problem."

The masked portion "Gxamqhrz" was enciphered for a first-level user by a keyword "dog" in conjunction with the linear (e.g., "abcde . . . vwxyz") code base and the cloaked portion "Mpbqtiq" was enciphered for a second-level user by using a keyword "cat" (e.g., a positive numerical cipher-offset value of 3-1-20) in conjunction with the same linear code-base.

Exemplar 3

This EXEMPLAR 3 provides multilevel encryption where selected private text portions are masked by ostensibly random cipher-characters using the mentioned linear code base and recoverable by all authorized users, while the recovered portions may further reveal secondarily masked cipher-character text that is recoverable only by specifically authorized users. For example, the text:

"Mary and Adam will be flying to Phoenix on Tuesday."
is cloaked to a first level to read:
"Pblb and Deup will be flying to Phoenix on Tuesday."
by cloaking "Mary" and "Adam" using the crypto-key "cat" (e.g., 3-1-20).

The text is further privatized to a second level to read as:
"Tqsf and Htbt will be flying to Twvicpb on Xjlwshc."
by further enciphering "Pblb" and "Deup" the yet-uncloaked text "Phoenix" and "Tuesday" using the crypto-key "dog" (e.g., 4-15-7).

By some time later using the key "dog" during decryption, this test is later text decrypted to the first level of encryption to read:

"Pblb and Deup will be flying to Phoenix on Tuesday."

And subsequently, fully decrypted by using "cat" for uncloaking the cipher-characters of the "Pblb" and "Deup" text portions and revealing the original "Mary" and "Adam" names.

In other words, the cloaked entries may be stored, distributed, printed, read and later again re-typed into the same or another keyboard that, with the benefit of this invention and the encryption key "dog" the cloaked text "Phoenix" and "Tuesday" will become fully revealed while the names remain cloaked. The object of this bi-level encryption is to enable a second level user a "need-to-know" access to a portion of a private text document's private content by using the decryption key "dog" (e.g., the negative numerical cipher-offset value of 4-15-7) while another private portion such as the "Mary" and "Adam" names are withheld from the second-level user and revealed only to the first level user after the second round of decryption occurs using the decryption key "cat" (e.g., the negative numerical cipher-offset value of 3-1-20).

Exemplar 4

This EXEMPLAR 4 teaches the usage of a unique multiple keystroke combinations to trigger the encipherer ON and OFF on the fly, as the mixed content text is being typed into the keyboard to produce the scan-code signal that couple with the unsecure computer.

In other words, using the sentence of EXEMPLAR 3 a control character sequence such {1[(e.g., a scan-code value of 12h 54h F0h 54h F0h 12h) serves to turn the first crypto-key (e.g., "dog") encipherer ON and the character sequence ]1} (e.g., a scan-code value of 5Bh F0h 5Bh 0Eh F0h 0Eh 12h 5Bh F0h 5Bh F0h 12h) serves to turn it OFF, where for example "Mary" is keyboarded as "{1[Mary]1}" and a second crypto-key (e.g., "cat") selection results in "Phoenix" being keyboarded as "{2[Phoenix]2}" to turn the second crypto-key selection ON and OFF. The numeric value in the control character sequence is used to determine crypto-key selection. For this example, a message sentence under this EXEMPLAR 4 is keyboarded as:

"{1[Mary]1} and {1[Adam]1} will be flying to {2[Phoenix]2} on {2[Tuesday]2}."

This typed-in message (including the control characters) yields a scan-code pattern of:

12h 54h F0h 54h F0h 12h 0Eh F0h 0Eh 54h F0h 54h which turns ON encryption, followed by the to be protected name "Mary"

12h 15h F0h 15h F0h 12h 4Dh F0h 4Dh 35h F0h 35h 21h F0h 21h with the key entries to turn OFF encryption as:

5Bh F0h 5Bh 0Eh F0h 0Eh 12h 5Bh F0h 5Bh F0h 12h with this entry of the name "Mary" illustrating a workable approach for teaching the invention, albeit by no means being "the only way" for accomplishing the desired encryption of the name.

In this example, "Mary" and "Adam" become masked by the level-1 private crypto-key "cat" to be rendered on a display, transferred to a server of the cloud computing environment, held in storage or printed-out as:

"Pblb and Deup will be flying to Twvicpb on Xjlwshc."
while "Twvicpb" and "Xjlwshc" are enciphered using the level-2 crypto-key "dog."

The object of this dual encryption is to enable both a first-level user and a second level user a "need-to-know" access to a designated portion of a private text document's private content. By using the encryption key "cat" the first level user can reveal the level-1 private portion names "Mary" and "Adam" and a second level user by using the decryption key "dog" exclusively reveals the level-2 private portion information "Phoenix" and "Tuesday."

Exemplar 5

Through practice of further "super-encryption" of the privatized text of EXEMPLAR 4 the same text:
"Pblb and Deup will be flying to Twvicpb on Xjlwshc." may be layer-protected with a super-level crypto-key "bug" (or numerical cipher-offset value 2-21-7) to read:
"Rwsd and Fzbr will be flying to Vrckxwd on Zesynoe."
In other words, the text containing the cloaked entries may be stored, distributed, printed, read and later again readily re-typed and partially decrypted using the keyboard entry of:
"{3[Rwsd]3} and {3[Fzbr]3} will be flying to {3[Vrckxwd]3} on {[3Zesynoe]3}".
Typed into the same or another keyboard where "{3[" calls the crypto-key "bug" for decryption.
The partially recovered text appears with the level 1 and level 2 cloak character encryption and may be further decrypted as explained under EXEMPLAR 4.

Exemplar 6

This EXEMPLAR 6 teaches the usage of a unique device identification code (DIC) assigned to the encrypting apparatus to assure that decryption is performed on the same unit and no other unit will suffice. In effect, a unit might be assigned a DIC of "237" which combines with the order of the private crypto-key. For example, if the crypto-key is "dog" and this equates to a numerical cipher-offset value of 4-15-7 the DIC value and crypto-key value may sum as:

| Crypto-key = dog = | 4 | 15 | 7 |
| Proprietary DIC = | 2 | 3 | 7 |
| Encoding key = | 6 | 18 | 14 |

In other words, the crypto-key "dog" equates to a numerical cipher-offset value 4-15-7 that is added to the proprietary DIC of 2-3-7 to yield a sum of 6-18-14 with an equivalent alpha value "frn." The result of this is that the name "Adam" (see EXEMPLAR 4) appears as "Gvos" instead of "Eshq" and requires the blended use of the crypto-key and the DIC to gain meaningful decryption.

Exemplar 7

This EXEMPLAR 7 teaches the usage of a unique user identification code (UIC) assigned to the encryption user to assure that decryption is performed by the same user and no other user will suffice. In effect, a user might be assigned a personal UIC of "714" which combines with the order of the private crypto-key. For example, if the crypto-key is "dog" and this equates to a numerical cipher-offset value of 4-15-7 the personal UIC value and crypto-key value may sum as:

| Crypto-key = dog = | 4 | 15 | 7 |
| User ID Code = | 7 | 1 | 6 |
| Encoding key = | 11 | 16 | 13 |

In other words, the crypto-key "dog" equates to the numerical cipher-offset value 4-15-7 that is added to the personal UIC of 7-1-4 to yield a sum of 11-16-13 with an equivalent alpha value "kpm." The converted alpha-equivalent value "kpm" is what the crypto-key "dog" is essentially changed into.

Hence, the crypto-key "dog" will not alone allow deciphering a privatized text by any user aside from the user having the personal UIC of "7-1-4." The result of this is that the name "Adam" (see EXEMPLAR 4) appears as "Ltnx" instead of "Eshq" and requires the blended use of the crypto-key and the personal UIC to gain meaningful decryption. It is furthermore obvious that the DIC and the UIC may be combined with the crypto-key to attain a hybrid level of device-specific and user security.

Encryption Explanation

While it is not a principal object of this invention to be limited to any one form of encryption, the particular technique used for illustrative purpose throughout this invention's discussions deserves explanation. When an encryption "key" (e.g., password) is used, it is converted into numerical equivalents based on the absolute position of each character relative with a "criterion array" of characters. For example, if a keyword example is "dog" and the criterion array is a linear series of characters:
   a b c d e f g h i j k l m n o p q r s t u v w x y z
   where: a=1, b=2, c=3<<<->>> x=24 y=25 z=26
resulting in the keyword "dog" to break down to: d=4, o=15 and g=7 while on the other hand, if the "criterion array" is randomly shuffled to instead appear as:
   i k z o b a d v c j y e m s h n g p u r l t q f w x
   where i=1 the virtual weight of "dog" becomes: d=7, o=4 and g=17
This teaches that the absolute position of each character in the keyword is assigned a number based upon its relative position in the "criterion character array" whether appearing in the linear or shuffled alphabetical order. The 26 alphabetical characters can be uniquely reshuffled into over 670 mixed-alphabetical orders. Hence it is imperative that the same "criterion array" be used for decryption as was used for encryption. In this elemental example, the virtual weight of a private text item such as "Boston" was established by counting forward by the weight of each key character on a rotating basis. In other words, using the encrypting key (password) "dog" or "4-15-7" determined from the linear criterion array the private word "Boston" encryption using the preceding shuffled criterion array is created by counting 4 characters to the right of "B" (where B=0), so:
   B=(b)+4=a d v c=C
   o=(o)+15=badvcjyemshngpu=u
   s=(s)+7=h n g p u r l=l
   t=(t)+4=q f w x=x
   o=(o)+15=badvcjyemshngpu=u
   n=(n)+7=g p u r l t q=q
in other words "Boston" is now ostensibly randomized and privatized to read "Culxuq."

It is apparent that the masked-word "Culxuq" can readily be typed into an ordinary keyboard and by using this invention to decipher the cloaked word, utilizing the same keyword ("dog") and the shuffled criterion array, counting is backwards, or to the left, of each cloak character (where the cloak character=0).

The encryption of data containing punctuations and numbers is an obvious extension of this elemental explanation. It shall further be obvious that the essence of this invention does not reside in nor become limited by the explicit detail of an encryption technique, but rather in merely providing user-selectable in-situ character cloaking of the scan-code data representing the private text as it flows between the keyboard's data signal output port and before it reaches the keyboard data signal input port of the computer. Any cloaking (or masking) scheme providing effective scan-code encryption is indubitably within the scope of this invention.

Preferred Utilization

In practice of the invention, the selective encryption functions are preferably embodied as a separate, free standing portable apparatus intersituated and serially interconnected between a standard keyboard's usual scan-code data signal output port or cable-connector and the keyboard data signal input port or receptacle of the unsecure computer. In other words, the keyboard's usual data signal output cable plugs-into and connects with a data signal input port receptacle on the encrypting apparatus while a jumper cable is linked between a data signal output port (e.g., "plug") on the encrypting apparatus and directly connects with the computer's keyboard data signal input port receptacle.

In an alternate practice of the invention, the encryption function hardware is contained directly within the keyboard's embodiment. In this arrangement, the encryptor is functionally intersituated between the physical keyboard scan-code data source and the keyboard's scan-code data output connector.

What This Invention "is" and "is-not"

This invention "is not" about encrypting an overall document file.

This invention "is" about encrypting selected private data entries submitted through a keyboard at the keyboard scan-code data signal level, prior to admission into the keyboard data signal input port of the unsecure computer.

This invention "is" about selectively encrypting private text portions of the user's document with a resulting cipher-character cloaking occurring in an "on the fly" manner where the private text portions of a document are specifically cloaked, while the remainder of the public text may remain in readily-readable plain language form.

This invention "is not" about utilizing software or hardware included in the unsecure computer to accomplish the encryption.

This invention "is" about intersituating a proprietary encipherer serving as an obfuscation device that is connected directly between a keyboard's scan-code data signal output port and the keyboard data signal input port of the computer.

This invention "is" about performing the private text character cloaking with a minimum of keyboard entry and data-flow interruption while keyboarding an aggregation of mostly public text containing a number of private text portions.

This invention "is" also about delivering several "levels" of encryption intended to limit and direct recovery of different protected portions of the original document's content to specific users.

This invention "is" about preventing keystroke-entry tracking of the private text scan-code data by malicious malware.

This invention "is" about preventing malicious malware from tracking "keystroke-entry" of private text as it is keyboarded.

This invention "is" about supplanting the private text characters with ostensibly random cloaking characters presented as readable, albeit meaningless, cipher-characters which may be printed and subsequently re-typed into a keyboard of a secure computer to achieve decryption and a meaningfully reconstructed replication of the text and format of the original mixed content document.

This invention "is" particularly about maintaining the protected text, including the substituted cloaking characters, in a formatted appearance corresponding with the original mixed-content document.

This invention "is" intended to produce a high degree of correlation between overall appearance of the original mixed-content text and the protected text by supplanting private-text alpha characters with alpha cloaking characters and private-text numerals with cloaking numerals that display and print in a consistent format.

OBJECTIVES OF INVENTION

An objective of the invention is to specifically obfuscate selected private text portions of a mixed content document including an aggregation of private and public text.

A priority of the invention is to enable an unsecure computer running an application program to be utilized to create and edit a document containing the aggregation of private text and public text.

A further priority of the invention is to enable the unsecure computer and application program to be used for editing or reformatting the cloaked version of the private and public text aggregation for storage on the unsecure computer's HDD, on a CD-ROM or DVD or to produce a video display or a printed hard-copy.

A purpose of the invention is to produce cloaking of the selected private text with a supplanting stream of ostensibly random cipher-characters that are readable, printable and subsequently capable of being retyped and intendedly decrypted for linking into a secure computer.

A gist of the invention is to allow a user to select and encrypt an indefinite number of private text portions of a mixed private text and public text content document while allowing unencumbered free-flow of the public text portions.

A unique objective of the invention is to preserve the post-encryption appearance of the protected text in an analogous format by supplanting private text alpha-characters with a similar number of cloaking alpha-characters and replacing private text numerals with cloaking numerals.

A variation of the invention is to permit the user to encrypt the keyboard scan-code data signal produced by entry of a number of different private text portions of the mixed content document with several unique encryption keys, thereby enabling several different levels of permissible decrypted recovery for each of the differing private text portions of the protected document's text by recipients having differing permission levels of authority.

A key purpose for the invention is to secure the keyboard scan-code data signal by supplanting the private text character entries with ostensibly random appearing cloaking characters prior to linking the scan-code data signal with the keyboard data signal input port of the computer.

The spirit of the invention is protect the user's private text character entries from keystroke tracking malware as well as clandestine or inadvertent interception or retention while routinely keyboarding the aggregation of public and private text characters into the unsecure computer or a network service.

A further goal is to broaden the capability of safeguarding private text buried in a mixed private and public content document that may be keyboarded into an unsecure computer or a virtual client computer serving a client-server based cloud computing system.

Still another proviso of the invention is to intervene between an ordinary keyboard and the unsecure computer to afford selective "upon demand" cloaking of the individual characters composing the private text data portions of a document with cipher-characters.

Yet another consideration of the invention is to adapt an ordinary keyboard and an ordinary computer to be used with a high degree of confidence in the secure creation and routine handing of a mixed content private and public text document.

The invention intends that a user may selectively protect private text intermixed with public text concurrent with the user's typing of the mixed content text into a computer keyboard with the assurance that the private text may be selected in situ, on-the-fly and masked by encryption prior to being linked to the keyboard input port of the unsecure computer.

A remaining object of this invention is to allow different selections of private text to be uniquely protected by distinctly different encryption keys to enable the protected text document to be entered into the unsecure computer and subsequently filed, viewed, printed or sent to various recipient parties with each uniquely encrypted portion of the protected text capable of being decrypted and made readable by a number of designated users having differing levels of "need-to-know" classifications.

DESCRIPTION OF DRAWINGS

This invention is depicted by 32 sheets of drawings showing 31 numbered figures, including:

FIG. 6—Keyboard scan-code data chart.

FIG. 10—Charting of derivation of cloak characters of FIG. 9.

FIG. 12—Charting of derivation of cloak characters of FIG. 11.

FIG. 13—Conversion of private text into cloak characters using three unique scrambled listings of cloak characters.

FIG. 14—Charting of derivation of cloak characters of FIG. 13.

FIG. 15—Conversion of text into cloak characters into encrypted scan-code data.

FIG. 16—Text showing reformatting and editing possibilities utilizing protected text that has been privatized using cloak character groups.

FIG. 30—Utilizing the encryptor apparatus intersituated between a keyboard and a wireless LAN or WAN network connection.

FIG. 31—Utilization of the encryptor apparatus with a diverse plurality of keyboard scan-code encodings.

DESCRIPTION OF INVENTION

Figure 1:
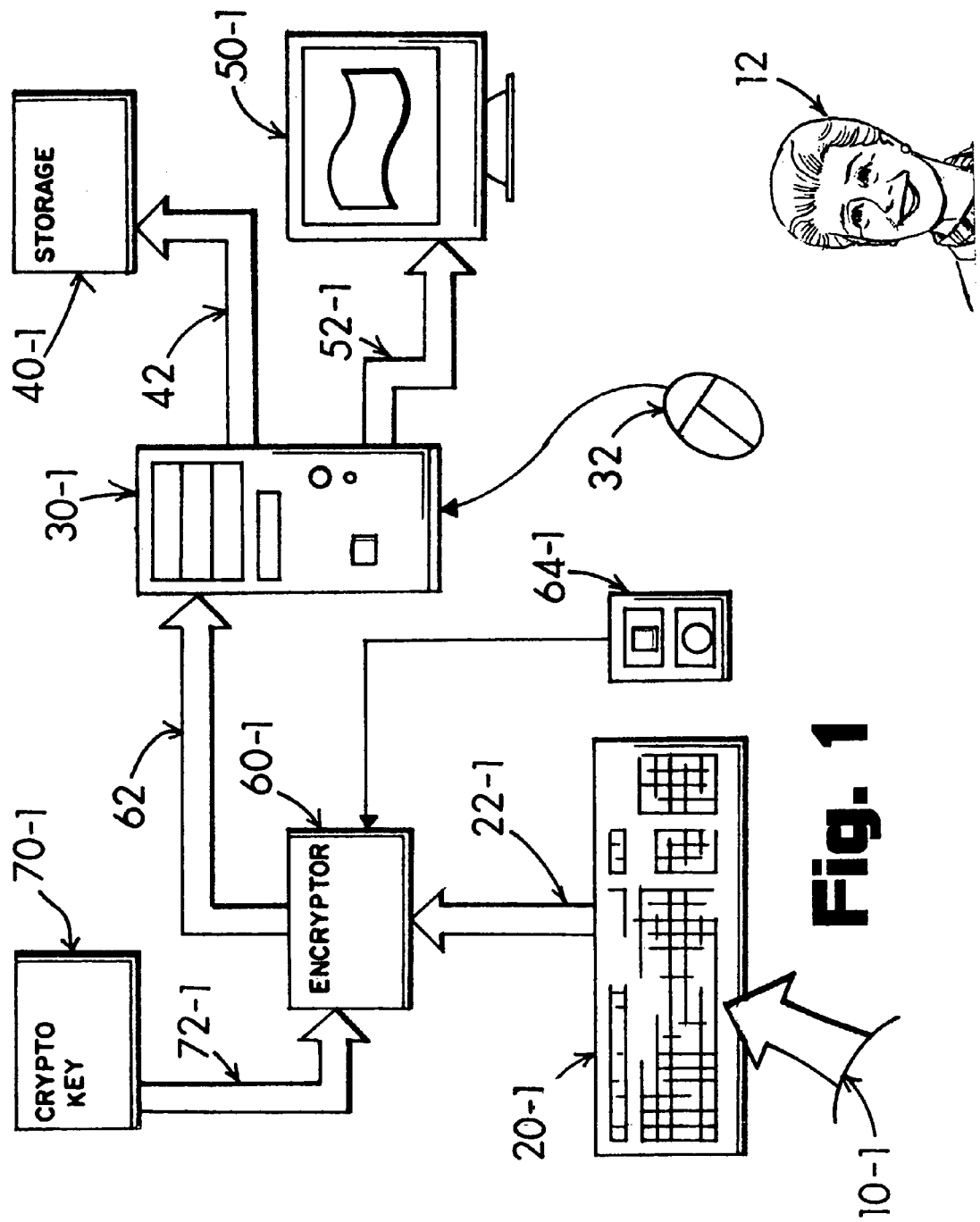
FIG. 1—An overall view showing a keyboard coupled with a computer setup with the scan-code data signal coupled through an encryptor.

A keyboard 20-1 couples raw keyboard scan-code data 22-1 with an encryptor 60-1 in the limn of FIG. 1. A manual selector 64 (e.g., user-operable switch, etc.) may selectively engage and disengage the encryption event concurrent with private text being typed-in 10-1 by a user 12. When enabled, the encryptor 60-1 utilizes crypto-key data 70-1 coupled 72-1 with the encryptor to deliver cloaked-text scan-code data signal linked 62 to an unsecure computer 30-1. In this showing the unsecure computer 30-1 couples 42 with a storage medium 40-1. The unsecure computer also couples 52-1 with a display monitor 50-1 and a mouse 32 is shown coupled with the computer.

Figure 2:
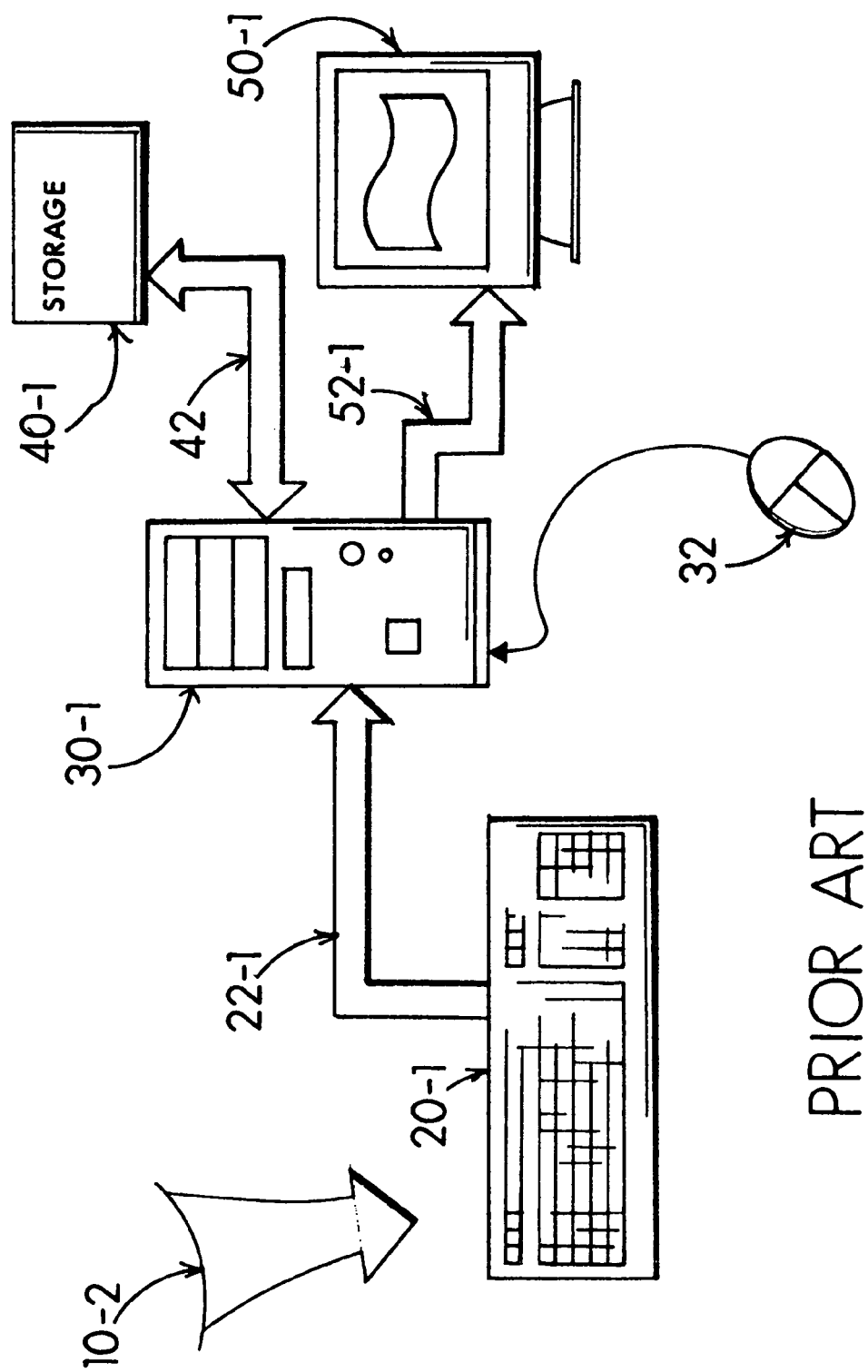
FIG. 2—View of a prior art computer setup of a keyboard and computer.

A well known prior-art computer configuration is depicted in FIG. 2 to include the keyboard 20-1 coupled 22-1 directly into the computer 30-1. As a result, whatever text aggregation of public and private text the user 12 types 10-2 into the keyboard 20-1 is delivered as conventional scan-code data signal 22-1 directly into a keyboard data signal input port on the computer 30-1. The result is that private text as well as public text data reaches the storage 40-1 provisions coupled 42 with the computer. The storage provision ordinarily includes internal RAM, hard-drives (or flash drives) and processing registers as well as a plethora of removable medium possibilities, such as floppy discs, CD-ROM drives, removable hard drives, zip drives, "flash-cards," "thumb" drives and similar storage-capable mediums.

It is well known that this FIG. 2 representation of the unsecure prior-art computer system is vulnerable to inadvertent data retention in each of the storage media 40-1. This vulnerability occurs because the typical computer does not actually eradicate the entirety of "erased" or "deleted" files, but rather it simply spoils the FAT (file allocation table) access information. As a result, any one of the usual storage mediums may violate confidential file privacy by an inadvertent residual retention of a data shadow even after the user has quit using the computer and supposedly "deleted" at least the private text information. The problem is that since deletion only results in foiling the FAT, the residual data may still be reaped by scavenging, hacking or retrieving by surreptitious access. This access may either occur unintentionally while the computer is being used by another user, or more importantly it may be retrieved by nefarious intent of unauthorized user who may gain public or clandestine access to the computer.

In another perspective, the computer hookup of FIG. 1 may be made at least temporarily usable for processing an aggregation of public text and private text information. For example, the representation provided in FIG. 3 includes a quite ordinary keyboard 20-3 providing a keyboard scan-code data signal 22-3 that couples with a mode selector 66-1. When the mode selector bridges the signal path A-B the scan-code data signal 22-3 couples 68-1 directly with an "OR" function 86 to provide the scan-code data signal output 62-21 coupled 62-3 with the keyboard data signal input port 34 on the unsecure computer 30-1. This computer includes several unguarded storage provisions 44 including RAM 44-1, mass-storage (e.g., HDD, etc.) 44-2 and this provision may include connection with a network (e.g., LAN, WAN, "Internet," etc.).

By a manual rest of the mode selector 66-1 to alternatively bridge the signal path A-C the keyboard scan-code 22-3 is routed 68-2 to an encryptor 60-2 that couples 72-1 with the crypto key 70-1. This enables the effective encryption 60-2 of the scan-code 68-2 to deliver "printable" cloaked scan-code characters 62-12 to another input of the OR function 86. In this context, "cloaked scan-code" means providing a substitute keyboardable and preferably "printable" character having a merit determined by the crypto-key 70-1.

Figure 3:
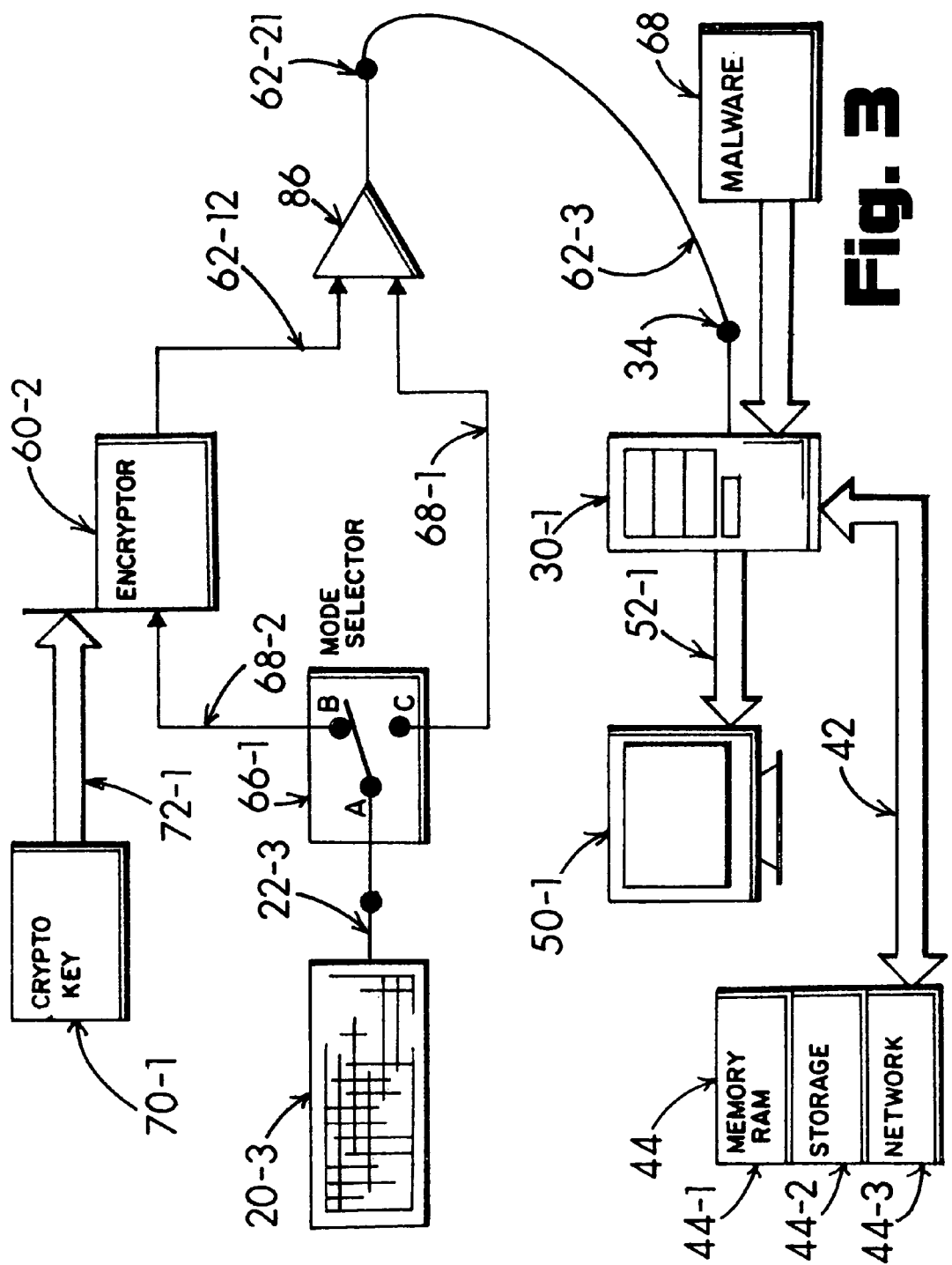
FIG. 3—Keyboard coupled through the encryptor serves to selectively cloak private text prior to coupling with the computer.
Figure 4:
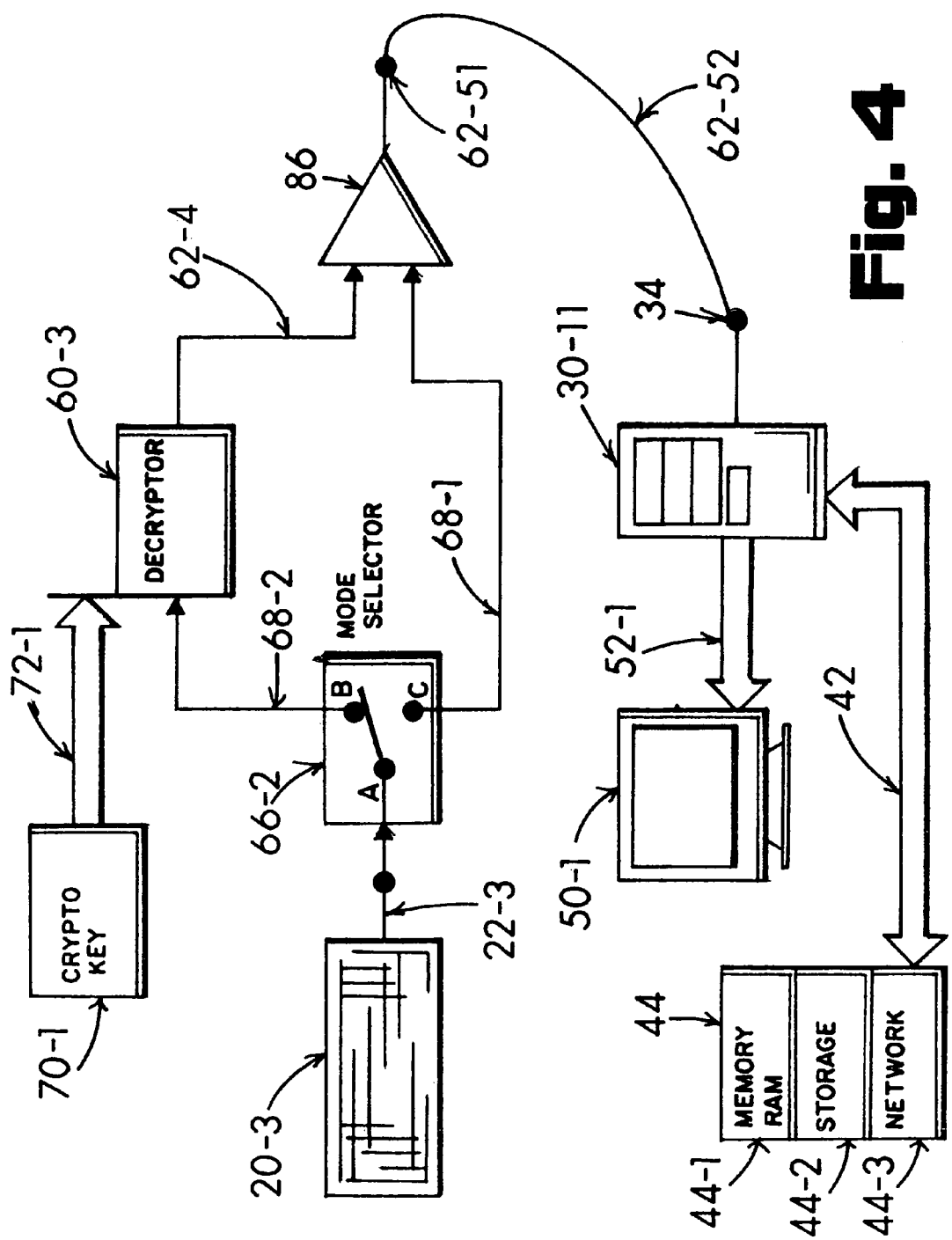
FIG. 4—Using a decryptor which serves to selectively decrypt cloaked private text characters typed in through the keyboard to enable deciphered readable text delivery to the computer.

Decryption of a privatized text is shown in the limn of FIG. 4. The main difference of this FIG. 4 relative with FIG. 3 is that the encryptor 60-2 is reconfigured to serve as a decryptor 60-3. The previously privatized (selectively encrypted) text, which is composed as an aggregate of public plain text and private cloaked text is typed into the keyboard 20-3. The encryption process described relative with FIG. 3 preferably produces printable cloak characters to supplant the protected private text characters. The cloak characters ordinarily compose part of the aggregation of characters forming the protected text that may be typed-in through the usual keyboard 20-3 keybutton layout.

Decryption of the cloak characters is determined by the setting of the mode selector 66-2 so that when the scan-code signal path 22-3 bridges contacts A-B the scan-code signal containing the cloaking characters is routed 68-2 to the decryptor 60-3. The decryptor 60-3 acts inversely to decipher the enciphered scan-code portion as it is typed-into the keyboard 20-3 resulting in a deliverance of deciphered characters 62-4 to the "OR" function 86 which serves to combine the deciphered characters 62-4 with the unencrypted characters 68-1 routed through the mode selector 66-1 data signal contacts A-C from the keyboard data signal line 22-3. The result is a plain text scan-code data signal on line 62-51 that couples sourced scan-code 62-52 with a preferably secured computer 30-11 keyboard data signal input port 34.

Figure 5:
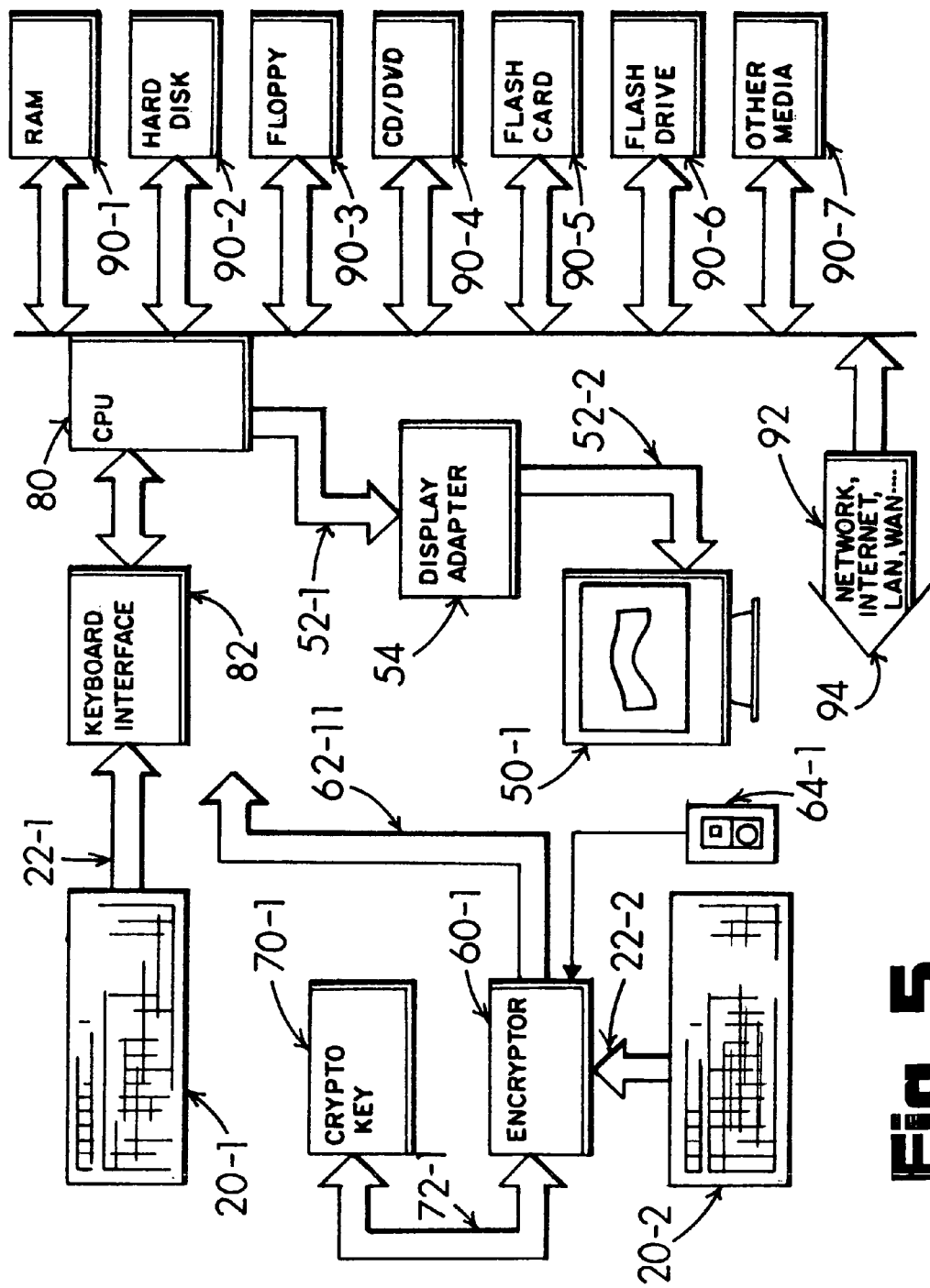
FIG. 5—Overall computer system with a keyboard directly coupled into the computer via a keyboard interface and alternatively a keyboard coupled through an encryptor which together with a crypto-key serves to selectively cloak selected private text entries.

A depiction of a overall computer system that may benefit from the invention appears in FIG. 5 to ordinarily include a keyboard 20-1 that connects 22-1 directly through a keyboard interface 82 with a central processor (CPU) 80. As this shows, the CPU data bus distributes the keyboarded input throughout a plurality of possible storage mediums including a RAM 90-1, an HDD 90-2, a floppy disc 90-3, a CD-ROM or DVD 90-4, a flash-card 90-5, a flash drive (thumb drive) 90-6 and other media 90-7 (e.g., external hard drive, etc.). It also shows that the CPU may couple through a network interface 92 with "the internet" through a LAN or a WAN 94.

In order to secure whatever private text that the user 12 may enter through a keyboard 20-2, the keyboard scan-code signal (output) may couple 22-2 with an encryptor 60-1 that together with a uniquely defined crypto key 70-1 coupled 72-1 with the encryptor a privatized signal 62-11 may be alternatively coupled into the keyboard interface so as to replace the "direct" connection 22-1. In this showing a manual selector 64-1 enables the user to alternate between enciphered-text and plain-text delivery of the 62-11 to the interface 82.

A listing of standard "Set 2" keyboard scan-code data signal codes including alpha-characters 6F1 and numerical characters and punctuations 6F2, 6F3 appears in FIG. 6. This listing also includes the numerical keypad assignments 6F4. Several of the ancillary command keys for SHOT etc. are also shown 6F5. Note that the scan-code recognizes "press" and "release" as two distinct codes 6F6 that must be recognized in order to produce a cloaking character "code-set" that may be subsequently decrypted to deliver a replication of the original character. For example, the character "a" key entry delivers a scan-code value "1Ch" when pressed and a scan-code value "F0h 1Ch" upon release. The upper-case "A" appears as "59h 1Ch F0h 1Ch F0h 59h" when the "Rshift" key (59h) is pressed and held while the "A" key is pressed and released (1Ch F0h 1Ch), followed by a release of the "Rshift" key (F0 59h).

Figure 7:
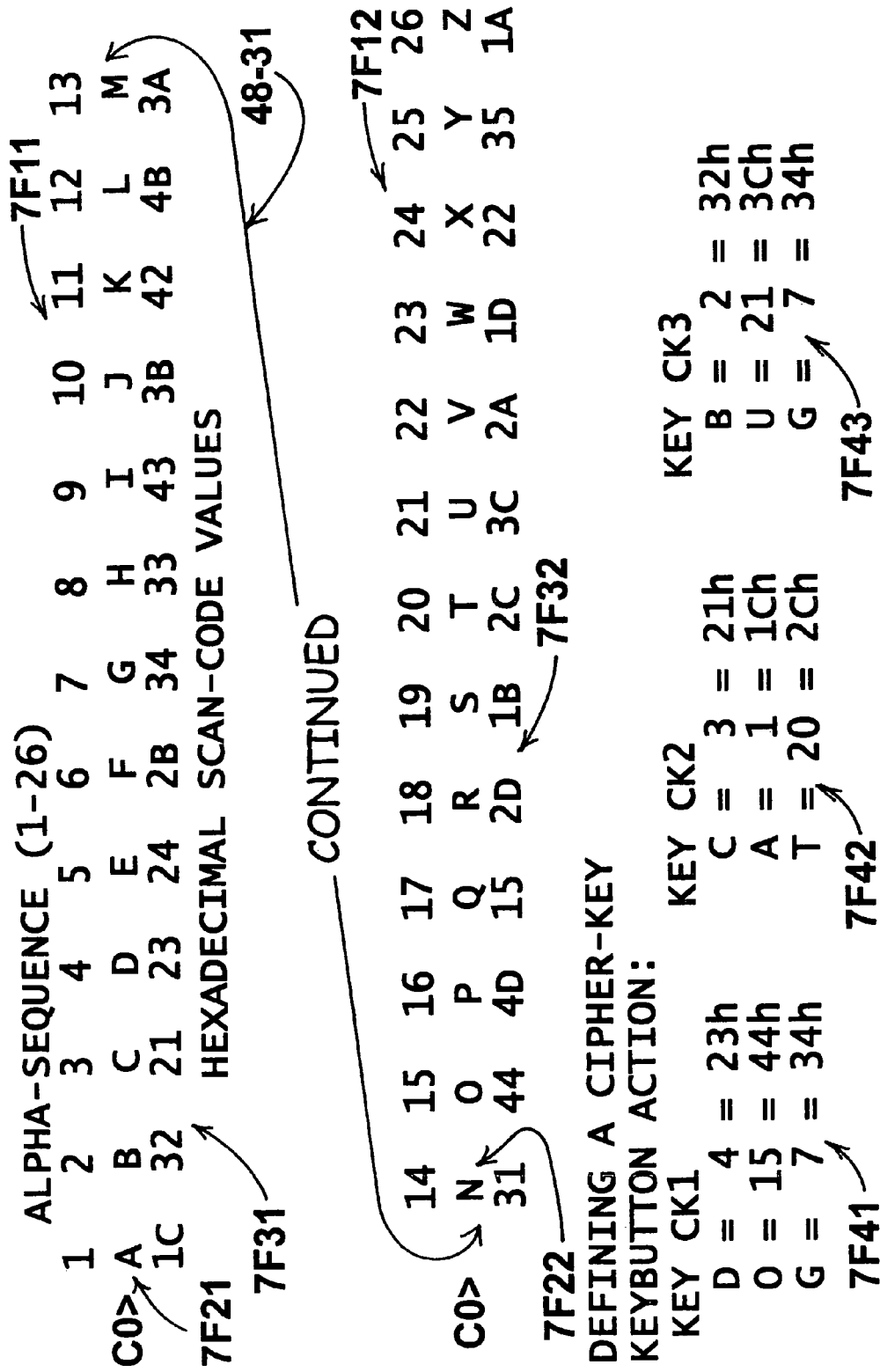
FIG. 7—Crypto-key (viz cipher-key) value conversions.

FIG. 7 gives an example of a preferred numerical cipher-offset value construction. Presently and elsewhere in this invention the cipher-key "words" are CK1="DOG" 7F41, CK2="CAT" 7F42 and CK3="BUG" 7F43 merely for discussion. A criterion array is shown, with the alphabet A to M 7F21 is continued 48-31 to include N to Z 7F22. Each character position of the criterion array 7F11, 7F12 associates with a hexadecimal scan-code value 7F31, 7F32. Taking the cipher-key "DOG," as depicted 7F41 "D" is the 4$^{th}$ position 7F41 (7F31 scan-code 23h), "O" is the 15$^{th}$ position (scan-code 44h) and "G" is the 7$^{th}$ position (scan-code 34h). The other two cipher-keys 7F42 and 7F43 are similarly defined.

Figure 8:
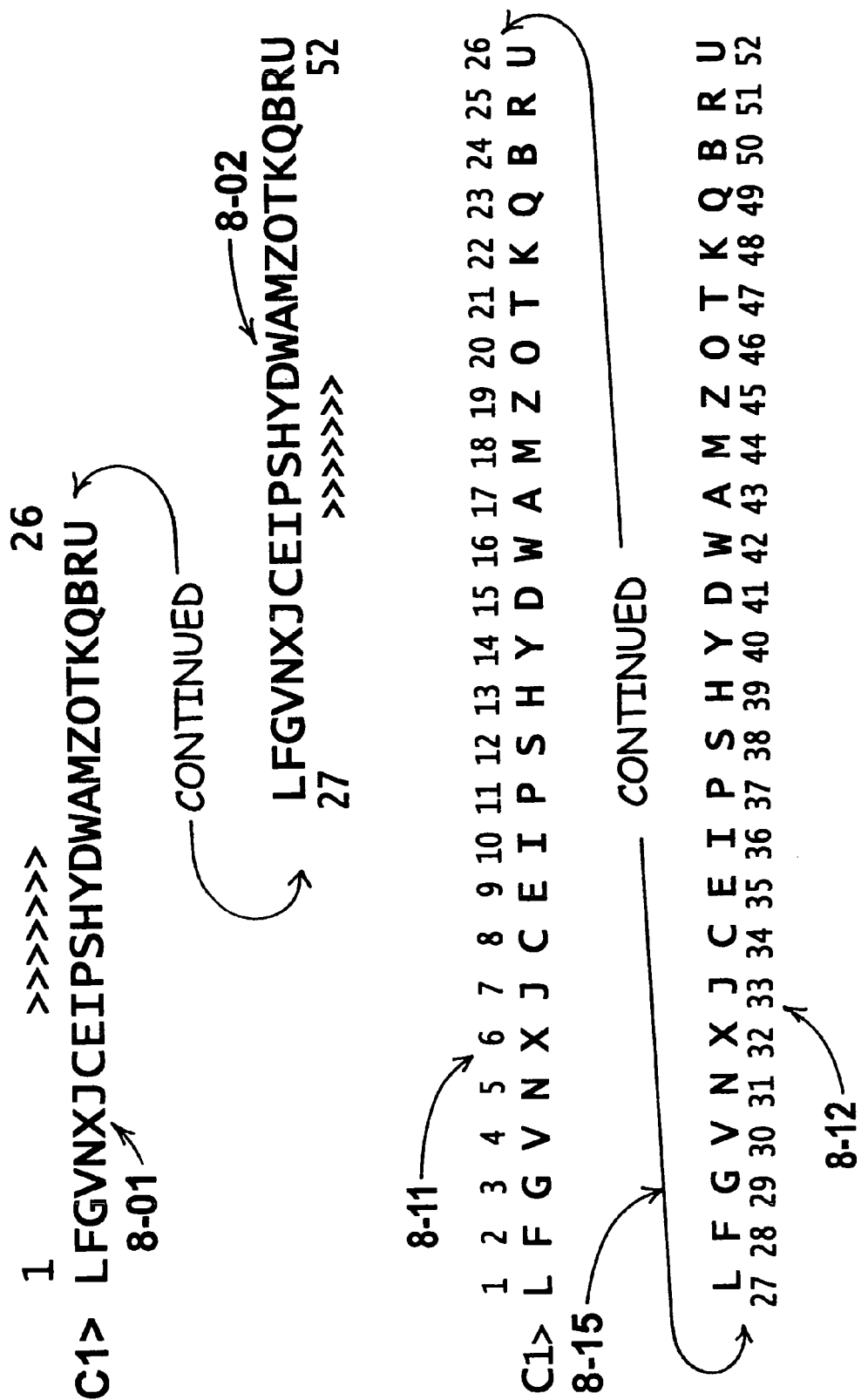
FIG. 8—Chart showing a duplexed continuum of scrambled alpha characters.

A crypto-code sequence C1 appears in FIG. 8 to include a 52 character printable character scramble consisting of a shuffled array of "A to Z alphabet characters" including L thru U 8-01 in positions 1 through 26, with a continued array 8-05 of identical second-string repetition as a characters L thru U 8-02 assuming positions 27 through 52. The overall 26 alpha-character sequence 8-01 represents one of an about 676 possible shuffled character array combinations of printable characters A through Z (e.g., possible scrambled code groups C1 thru C676).

Figure 9:
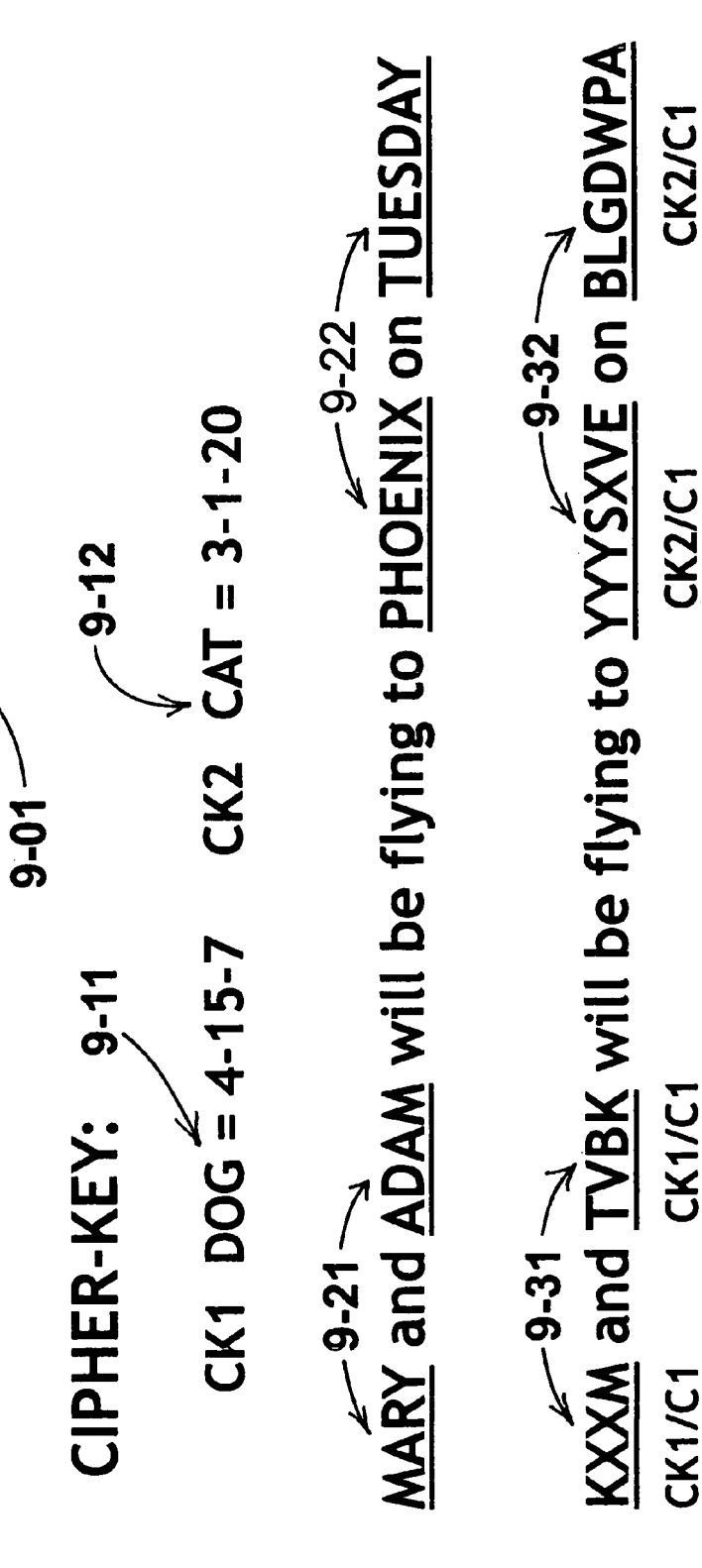
FIG. 9—Conversion of private text into cloak characters using two unique crypto-keys.
Figure 10:
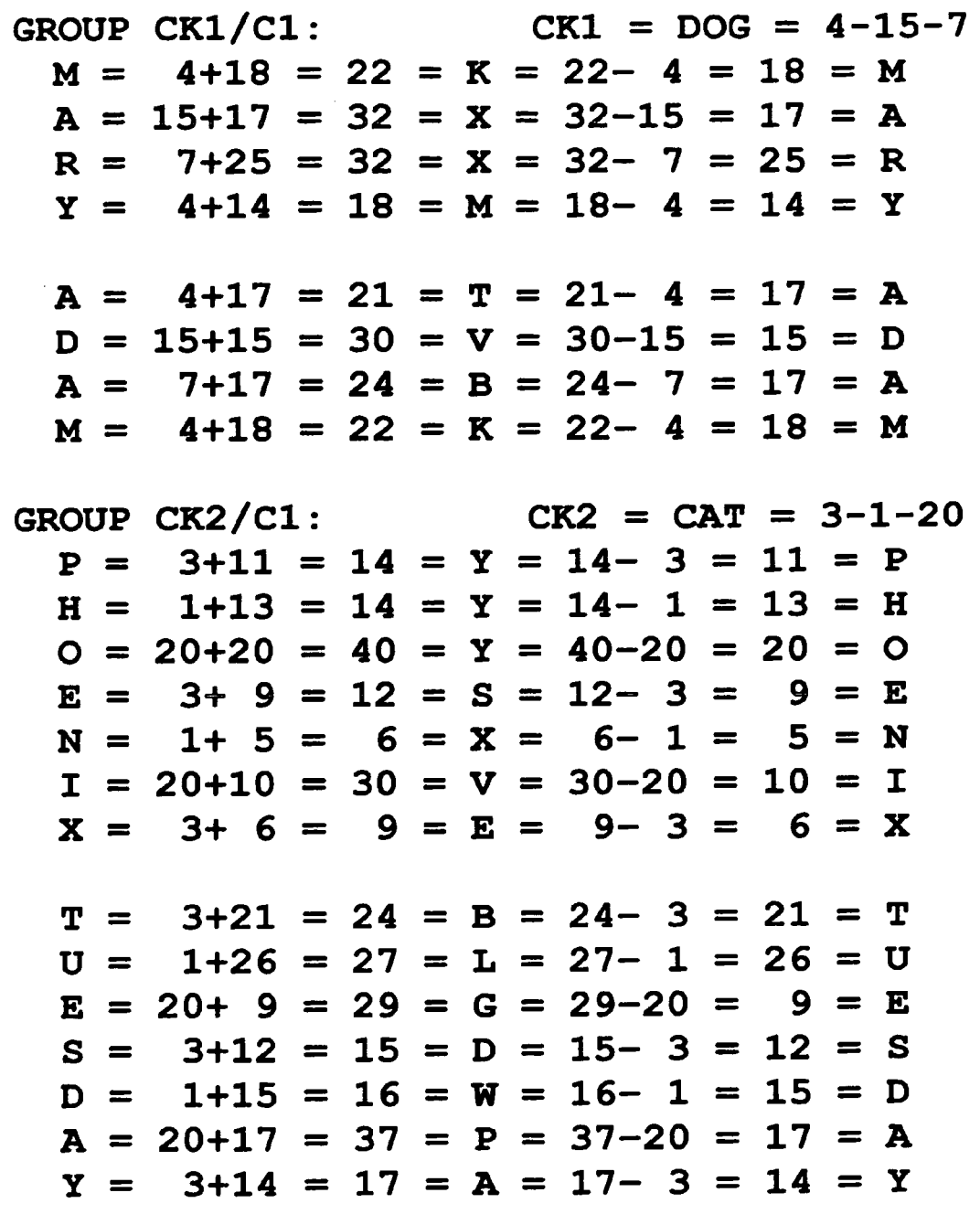

A specimen sentence "MARY and ADAM will be flying to PHOENIX on TUESDAY" is shown in FIG. 9 and elsewhere in this teaching. This sentence is said to include a first level of private text "MARY" and "ADAM" 9-21 and a second level of private text "PHOENIX" and "TUESDAY" aggregated with the public text "will be flying to", etc. Also shown in FIG. 9 are two alphabet sequences C0 of FIG. 7 and C1 of FIG. 8. In this example, the sequence C1 is utilized to encode the private text together with the cipher-key "DOG" CK1 9-11 and "CAT" CK2 9-12 values determined from the criterion array of the FIG. 7 discussion. The name "MARY" is found on the C1 group in position 18 and by adding the numerical cipher-offset value of "D=4" the position becomes 18+4=22 or "K" from the criterion array C1. Hence, the construction of surrogate cloaking characters follow the showing of FIG. 10 where "MARY" coalesces into a succedanea of the "KXXM" character string 9-31 as each cipher-offset numerical cipher-offset value advances 4-15-7 and repeats as the private word is encoded. As this shows, the repeated cloaking characters "XX" represent entirely different characters "AR" upon decryption. In a similar way "ADAM" coalesces into the cloaked string "TVBK" 9-31. The second level private words 9-22 are subsequent encrypted into the cloak letter combinations 9-32 by utilizing the second cipher-key "CAT" 9-12, as further depicted in FIG. 10.

Figure 11:
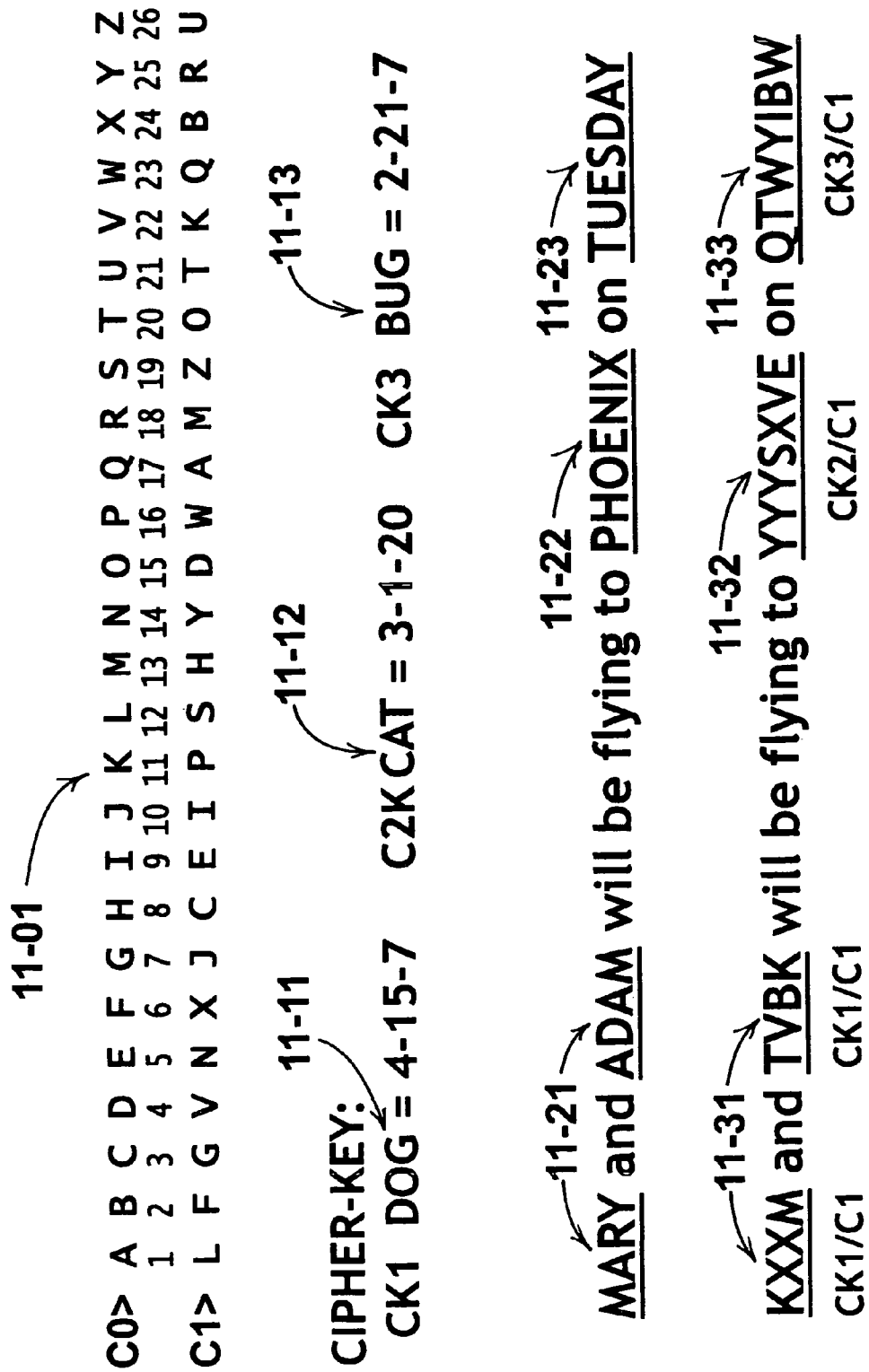
FIG. 11—Conversion of private text into cloak characters using three unique crypto keys.

Three distinct protection levels are shown in FIG. 11 by utilizing the code groups 11-01 in conjunction with three crypto keys "DOG" 11-11, "CAT" 11-12 and "BUG" 11-13. The private words "MARY" and "ADAM" 11-21 are converted into cloaking characters "KXXM" and "TVBK" 11-31 utilizing the crypto-key "DOG". The second level protection of the word "PHOENIX" 11-22 is cloaked using the crypto-key "CAT" to produce the cloaking characters "YYYSXVE" 11-32 and a third level of encryption of "TUESDAY" 11-23 is attained using the crypto-key "BUG" 11-13 to deliver "QTWYIBW" 11-33. The conversion of the private word values into cloaking letter sets is listed in FIG. 12.

Three different cypher character groups 13-01 serve to provide a cloaking distinction level between different text matter as shown in FIG. 13. The crypto-key "DOG" 13-11 defined in FIG. 7 is used in conjunction with three uniquely scrambled code groups C2, C3 and C4. The conversions are further represented in FIG. 14. The first private word set "MARY" and "ADAM" 13-21 is encrypted CK1/C2 with the scrambled code group C2 to yield the scrambled set "CWGA" and "DINJ" 13-31. Similarly, the second private word "PHOENIX" 13-22 is encrypted CK1/C3 using the code group C3 yielding "VWUNGBU" 13-32 while the third private word "TUESDAY" 13-23 combines CK1/C4 with the code group C4 to become "EIGOBIQ" 13-33.

Figure 15:
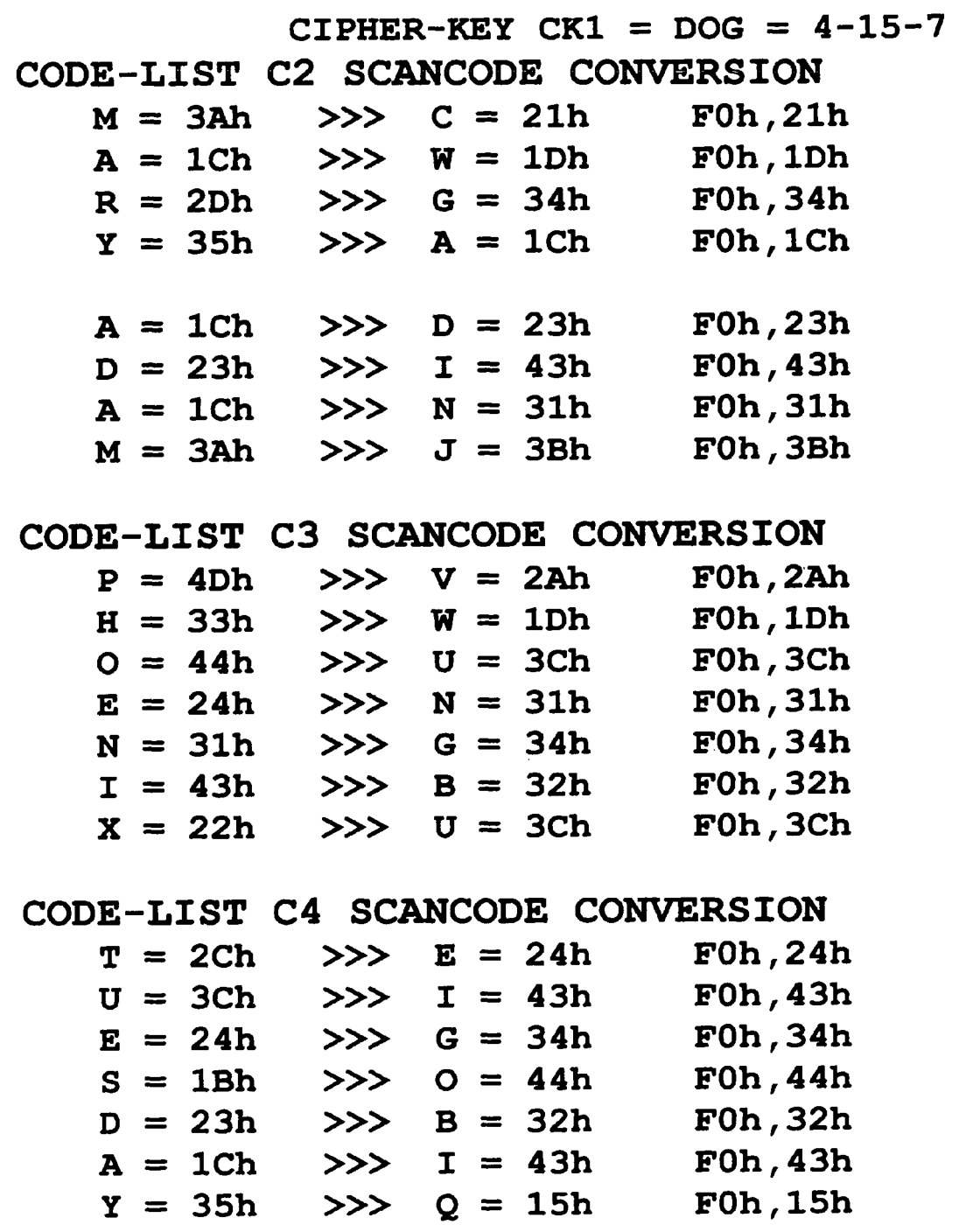

Scan-code conversion of the private words into cloaking characters is depicted in FIG. 15. For example, the code-list conversion begins by typing in "MARY" yielding scan-codes 3Ah, 1Ch, 2Dh, 35h which through the showing of FIG. 14 become the cloak characters "CWGA" having a scan-code value sequence of 21h, 1Dh, 34h, 1Ch. Well understood scan-code practice requires that the scan-code delivered to the computer, say 30-1 of FIG. 1 must include a sequence of "press and release" values. In other words, C=21h (key-press) followed by F0h, 21h (upon key-release) and so forth as the showings of FIG. 15 depict. The resultant scan-code sequences representing the cloaked character sets are then conveyed into the keyboard data signal input port of the unsecure computer 30-1.

An advantage of cloaking merely the private text is depicted in FIG. 16 to allow editing and reformatting of the overall textual content. For example, in the sentence "MARY and ADAM will be flying to PHOENIX on TUESDAY" including the private text content 16-21, 16-22, 16-23 aggregated with public test, such as "will be flying to" is encrypted with cloak characters 16-31, 16-32, 16-33 allowing the overall text to be edited instead to read (with the cloak characters) instead as: "CWGA and DINJ may be driving to VWUNGBU on EIGOBIQ" that decrypts into the edited text "MARY and ADAM may be driving to PHOENIX on TUESDAY." Furthermore, the partially cloaked text may be re-formatted to read "On EIGOBIQ CWGA and DINJ may be driving to VWUNGBU." to decrypt into the text "On TUESDAY MARY and ADAM may be driving to PHOENIX." Clearly the advantage of conveniently editing and re-formatting text is maintained by this invention's in situ cloaking without revealing the cloaked text itself.

Figure 17:
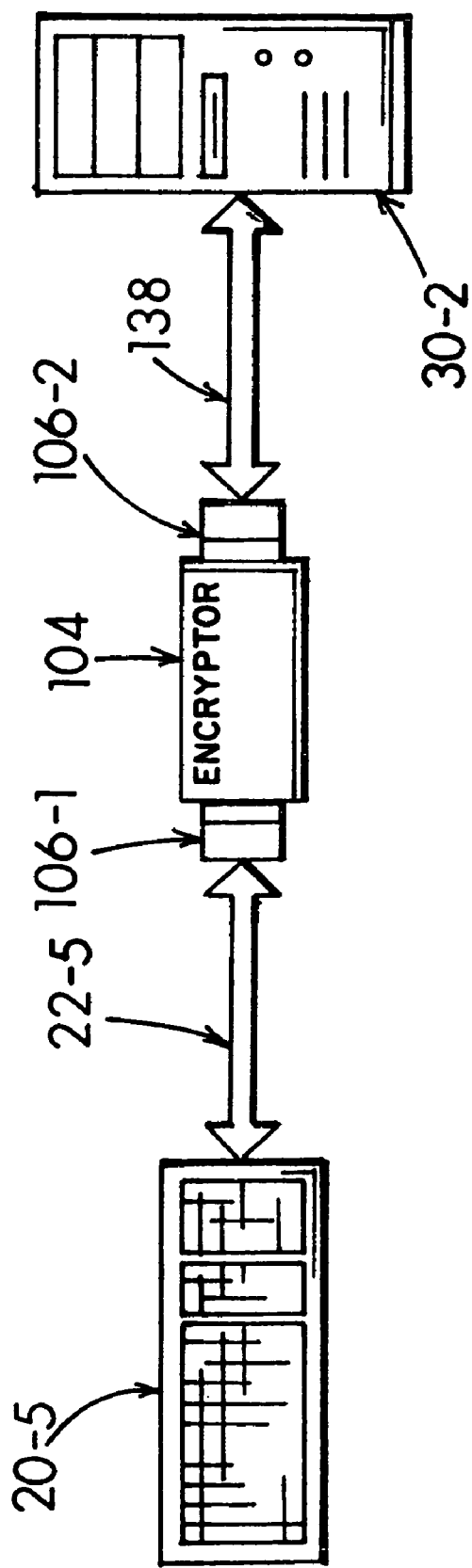
FIG. 17—Encryptor intersituated in scan-code data signal path between keyboard and computer.

A scan-code encryptor apparatus 104 is shown in FIG. 17 intersituated between a keyboard 20-5 and an "insecure" computer 30-2. The encryptor 104 may include an universal serial bus (USB) input connection 106-1 for receiving the keyboard 20-5 scan-code data signal 22-5 and an USB output 106-2 providing encrypted keyboard scan-code data signals 138 that link with an USB input port of the computer 30-2. USB interfacing of a keyboard with a computer is well known old-art and is merely mentioned.

Cloud Computing Environment

Figure 18:
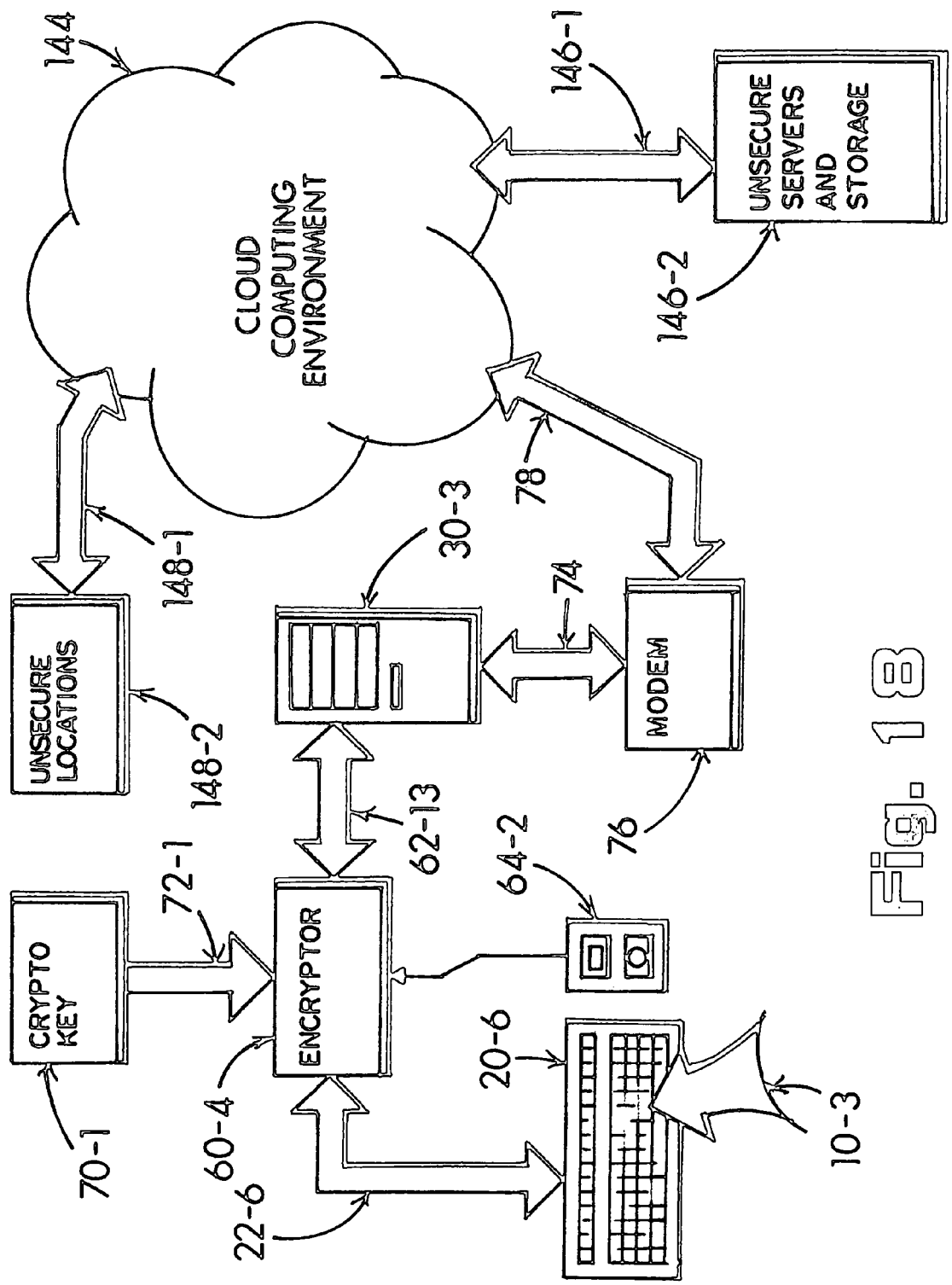
FIG. 18—Protecting private text keyboard entries from exposure to unsecure destinations in a cloud computing environment by encryption with cloak characters.

Typing mixed content text having both private and public content into a "cloud computing" system will benefit from this invention by enabling the user to have assurance that nothing really "private" is being submitted to distant servers having vague security qualifications. In the cloud computing environment of FIG. 18, mixed content data may be submitted through a computer 30-3 acting as a "virtual desktop" access point for sending keyboarded data to a central server sited elsewhere in the internet. The cloud-servers may provide a plethora of software facilities, including wordprocessing, data storage, spreadsheet handling and so forth. This invention provides the user with here-to-fore under-achieved safeguarding of private text information entry through the virtual desktop's keyboard 20-6 that couples 22-6 with the encryptor 60-4 to utilize the crypto-key 70-1 to deliver 62-13 an aggregated mix of plain public text scan-code data and cloaked private text scan-code data to the keyboard data signal port of the computer 30-3. While typing the user may select 64-2 between public text and private text content to control the encryption on an "as needed" basis. The computer including suitable software, couples 74 with a modem 76 that subsequently links 78 with the abstract-seeming "cloud computing environment" 144. This cloud environment usually includes linkage 146-1 with unsecure servers and storage 146-2 apparatus. The cloud environment may also include a linkage 148-1 with other systems in an unknown number of unsecure locations 148-2. A potential for interconnection with the internet through any one of a number of virtual desktops or servers intercoupled with the cloud environment also leads to increased and uncertain potential for the user's private text content being openly compromised.

Figure 19:
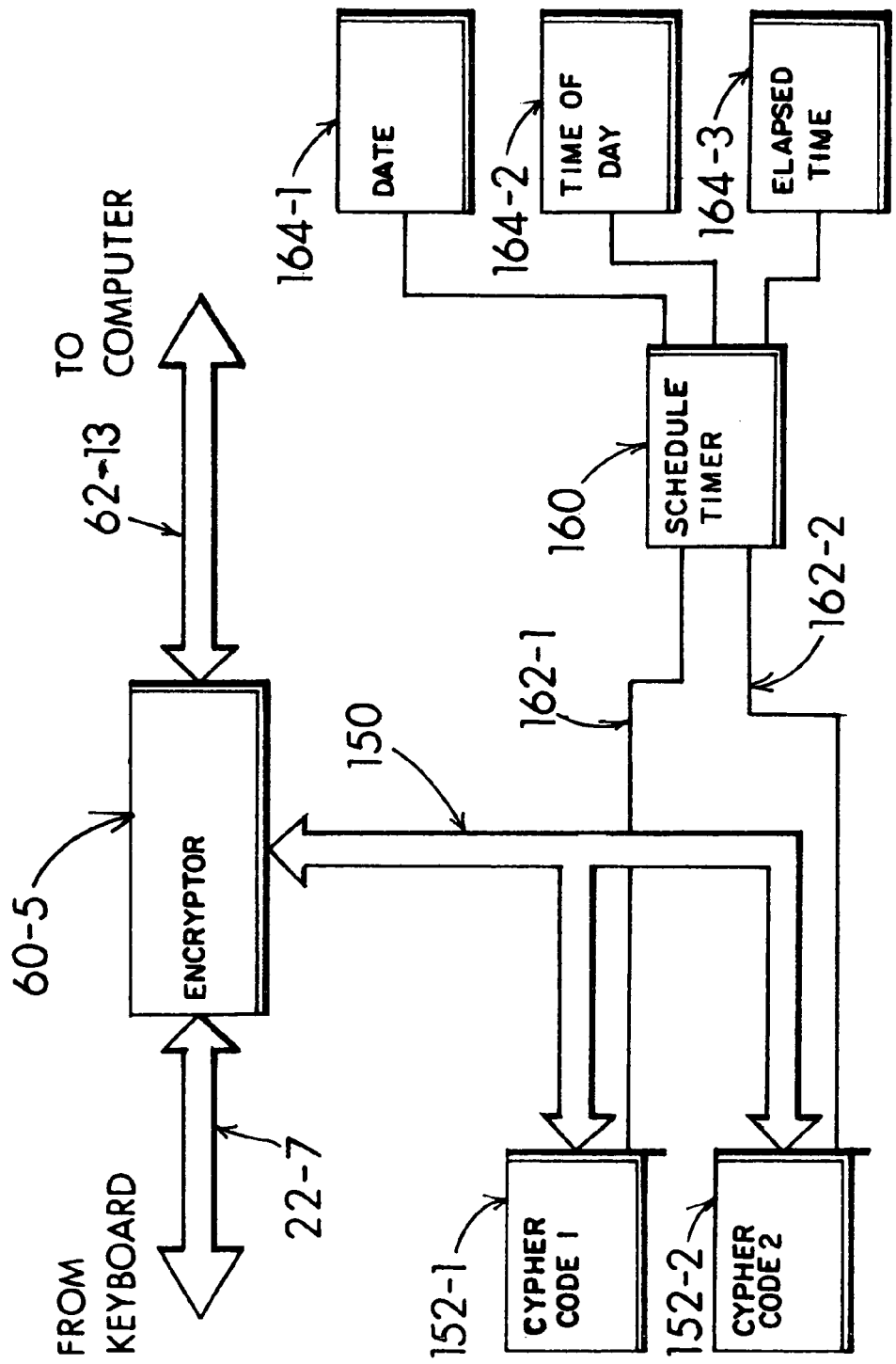
FIG. 19—Scheduling encryption and decryption opportunity for multiple users to occur during one or more pre-established time windows.

An increase in security may be achieved by enabling the encryptor 60-5 (or conversely, the encryptor reconfigured as a decryptor) to be utile only during predetermined time periods. For example, the cloak characters of a protected document's text may be limited to decryption only during an authorized recipient's "work hours." Obviously time restriction substantially reduces the likelihood for nefarious off-hour intrusions by unauthorized persons. FIG. 19 depicts the encryptor (decryptor) 60-5 coupled 22-7 with the keyboard (viz, FIG. 1 keyboard 20-1) and providing privatized data linked 62-13 with the computer (viz, 30-1 of FIG. 1). In this FIG. 19 arrangement two distinct modes of protection are expressed.

Exemplar A Time Control

Two cypher code provisions are provided which are active at different times of the day. Time control is of utility when for example in an office or the like where specific-time work-shifts are involved. For example, a date or date-period 164-1 may be specified, say 8/17-8/21 during which the schedule timer 160 may be enabled to accept a time of day 164-2 control signal, say 09:00 when enablement may occur but only for an elapsed time interval 164-3, say 360 minutes (6-hours). The result of this example is that access to the privatized data may only be accessed between 8/17 and 8/21 beginning at 09:00 for 6 hours, ending at 15:00. A timed enablement signal 162-1 may link with the "Cypher Code 1" memory 152-1 for coupling the cipher-key to the encryptor/decryptor 60-5.

Exemplar B Time Control

In addition to the EXEMPLAR A time control a multi-shift work environment may be accommodated by providing another timed enablement signal 162-2 that may serve to enable the "Cypher Code 2" memory 152-2 at a different time of day 164-2, for example a second shift beginning at 16:00 for an evening shift, or during a different date 164-1 validation period, say 8/22-8/23 where this might represent a week-end, e.g. Saturday and Sunday. This second "Cypher Code 2" period might be assigned to a "weekend worker" while the "Cypher Code 1" is assigned to the "weekday Monday-Friday worker."

User Identification Code (UIC)

Figure 20:
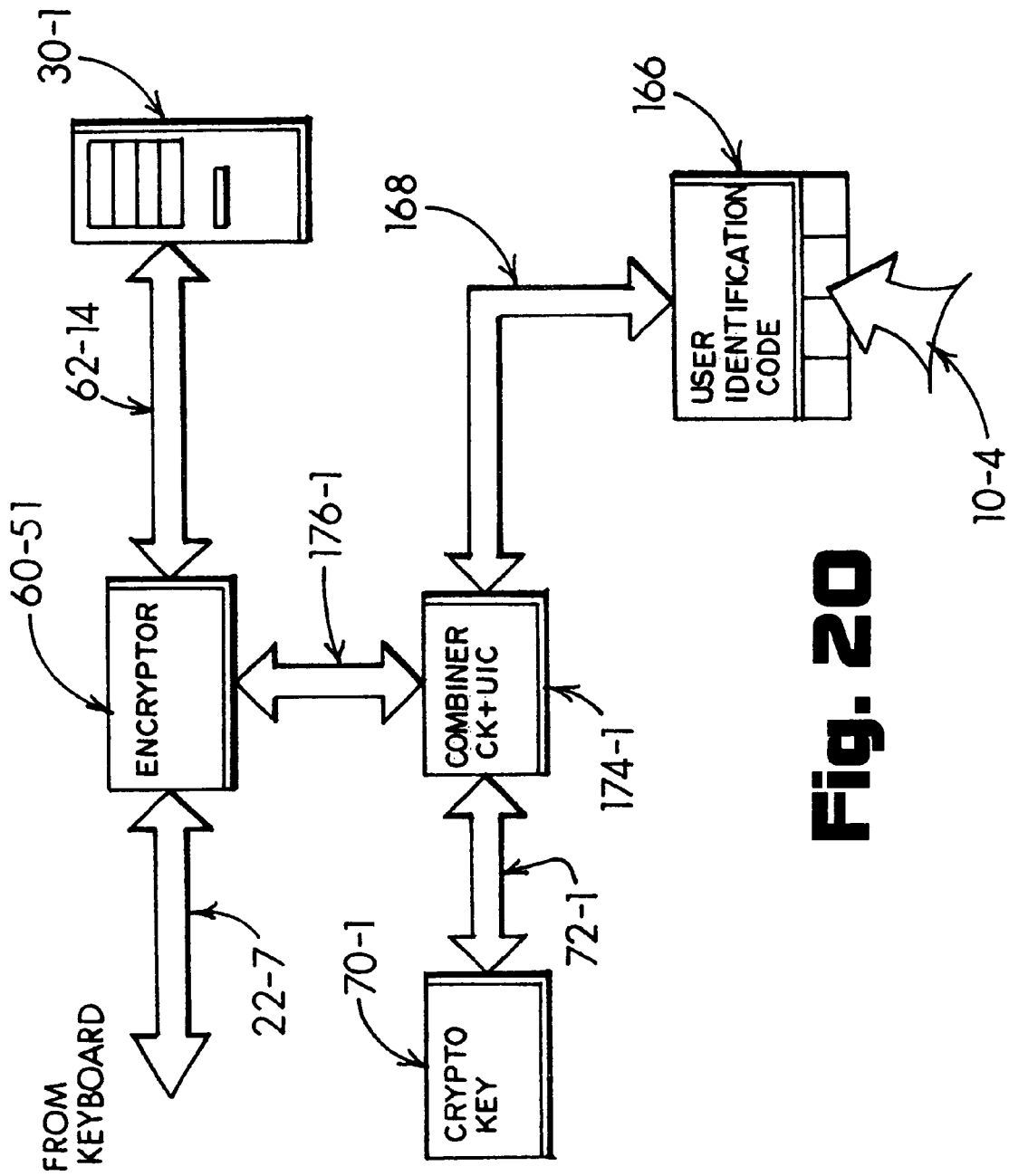
FIG. 20—Restricting encryption to a specific user through utilization of a personal User Identification Code (UIC) submission by the user.

In FIG. 20 the encryptor 60-51 receives the keyboard scan-code signals 22-7 and delivers privatized scan-code data signals 62-14 to the computer 30-1. Additional security for the crypto-key is provided by requiring the user to enter 10-4 a "User Identification Code" (UIC) through an entry keypad or other provision 166 which delivers the UIC validation signal 168 to a combiner 174-1. The combiner also accepts the crypto-key 70-1 coupled 72-1 with the combiner 174-1. The function of the combiner is to mesh the crypto-key signal 72-1 and the UIC signal 168 into a valid crypto-key linked 176-1 to the encryptor 60-51. A failure to enter a valid or correct UIC yields an invalid crypto-key coupling 176-1 with the encryptor. In this teaching, it must be realized that neither the crypto-key memory 70-1 nor the UIC entry data 168 used alone is wholly sufficient to correctly encrypt or decrypt a protected text message.

Device Identification Code (DIC)

Figure 21:
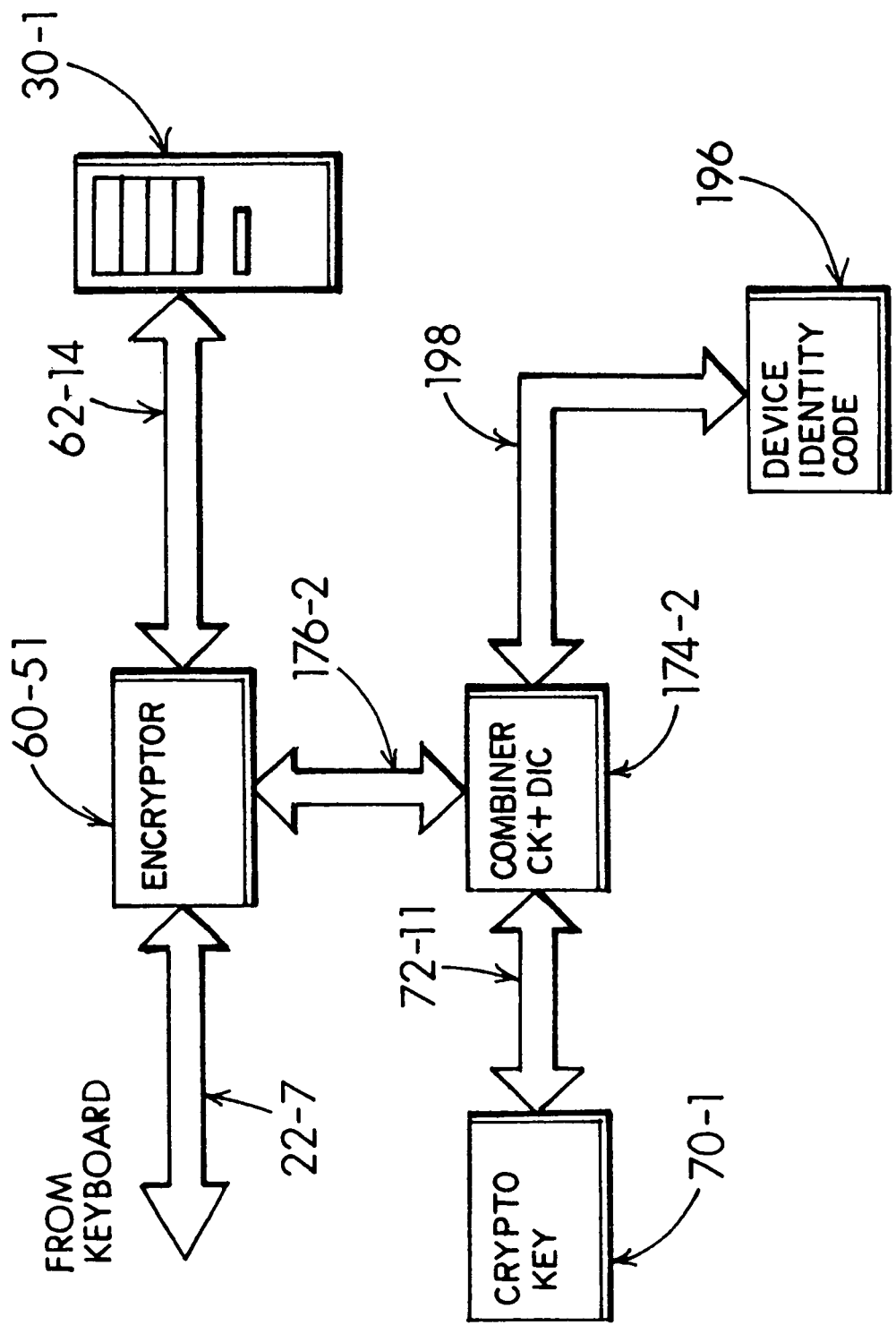
FIG. 21—Restricting encryption and decryption to a specific cloaking apparatus through utilization of a unique Device Identity Code (DIC) thereby denying decryption utilizing unauthorized apparatus.

Additional security for the crypto-key is provided in FIG. 21 by requiring the user to utilize the same "Device Identification Code" (DIC) 196 assigned to the encryption apparatus for decryption of a privatized text message. In other words the same obfuscation apparatus as was used for encrypting the privatized text must be used for decryption. This averts a likelihood for unauthorized apparatus being of much use to an intruder or hacker. This device qualification is accomplished by assigning a unique DIC to the obfuscation apparatus and linking 198 the DIC validation signal to a combiner 174-2. The combiner also links 72-11 with the crypto-key 70-1. The function of the combiner is to mesh the crypto-key 72-11 and the unique DIC code 196 into a valid crypto-key linked 176-2 to the encryptor 60-51. A failure to use an obfuscation apparatus having a valid DIC 196 yields an invalid crypto-key coupling 176-2 resulting in a negation of the encryption. It is obvious that neither the crypto-key memory 70-1 nor the encryptor's DIC 196 used alone is wholly sufficient to correctly encrypt or decrypt a privatized text message.

Figure 22:
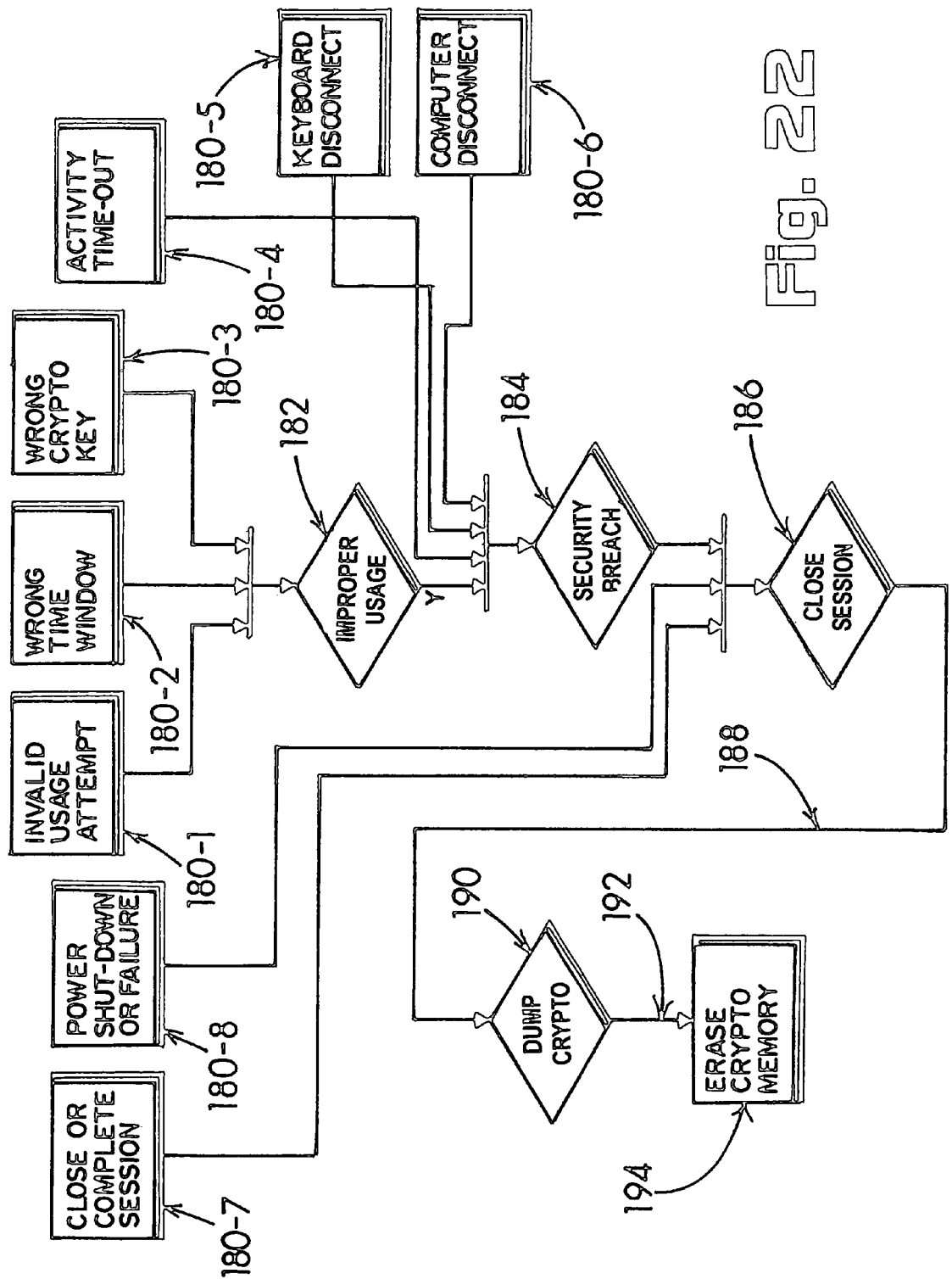
FIG. 22—Flow chart depicting numerous conditions which can serve to signal a security breach or session-completion condition to close a session and purge residual sensitive data from memory, registers, etc.

A practicable encryptor apparatus is likely to include memory and register provisions which have a potential for retaining data even after use of the encryption or decryption steps are complete. In FIG. 22 numerous events included alone or in combination are shown to serve as a "trigger" to purge the encryptor apparatus of inadvertently retained data. An "Invalid Usage Attempt" (IUA) 180-1 is introduced, for example, by using the wrong DIC or UIC that may deliver a fault signal to an "Improper Usage" (IU) function 182. An attempt to use the apparatus during a "Wrong Time Window" 180-2 (see FIG. 19 description) may also trigger the IU 182. Attempting to enter a "Wrong Crypto Key" 180-3 also triggers the IU 182. Any of these error events provides cause for the IU logic 182 to deliver a fault signal to a "Security Breach" function 184. Other IU fault conditions may be brought by recognizing "Activity Time-Out" 180-4, a "Keyboard Disconnect" event 180-5 and by disconnecting the computer 180-6. The IU security breach function 184 subsequently links a shut-down command signal to a "Close Session" function 186. Other commands that may be introduced directly to the Close-Session function 186 include a "Close or Complete Session" event 180-7 usually submitted by the user and a "Power Shut Down or Failure" event 180-8 command signal.

Upon receiving a command signal, the Close Session function 186 sends a command signal 188 to activate the "Dump Crypto" 190 sequence and delivers a dump-command signal 192 to the "Erase Crypto Memory" functions that act to thoroughly purge the resident memory and registers in the encryptor apparatus so that they are effectively scrubbed and therefore free of any residual confidential data.

Figure 23:
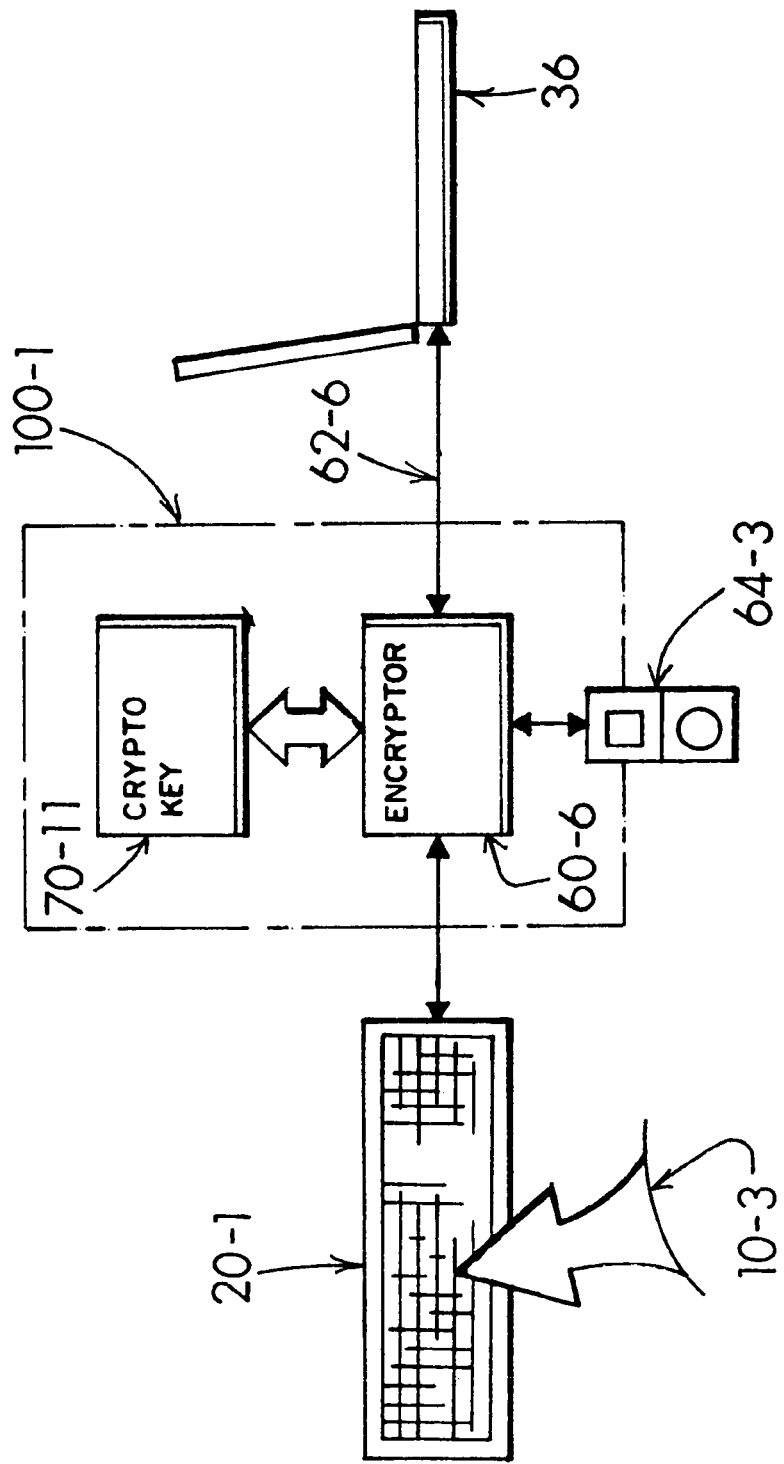
FIG. 23—Keyboard and encryptor apparatus used in conjunction with a portable computer.

The invention is depicted in the limn of FIG. 23 to be a "CLOAKING ACCESSORY" operative as an independent apparatus 100-1 which is intersituated between a keyboard 20-1 and a laptop, notebook, netbook or portable computer 36. When the user enters 10-3 an aggregation of private and public text into the keyboard, the keyboard scan-code data signal is coupled with an input of an encryptor 60-6 included in the cloaking accessory 100. A crypto-key 70-11 is provided to the encryptor 60-6 and a manual enabling selector 64 may engage and disengage the enciphering performance of the encryptor, resulting in a privatized scan-code data signal 62-6 that couples with the keyboard data signal input port of the portable computer 36. As a result, the portable computer 36 may be denied any entry whatsoever of private or confidential information that may be entered 10-3 into the keyboard by the user, as determined under the control of the manual selector 64. This part of the invention's teaching is reflected in the earlier application Ser. No. 12/586,419, filed Sep. 23, 2009 for "Selected Text Obfuscation and Encryption in a Portable Computer Environment."

Figure 24:
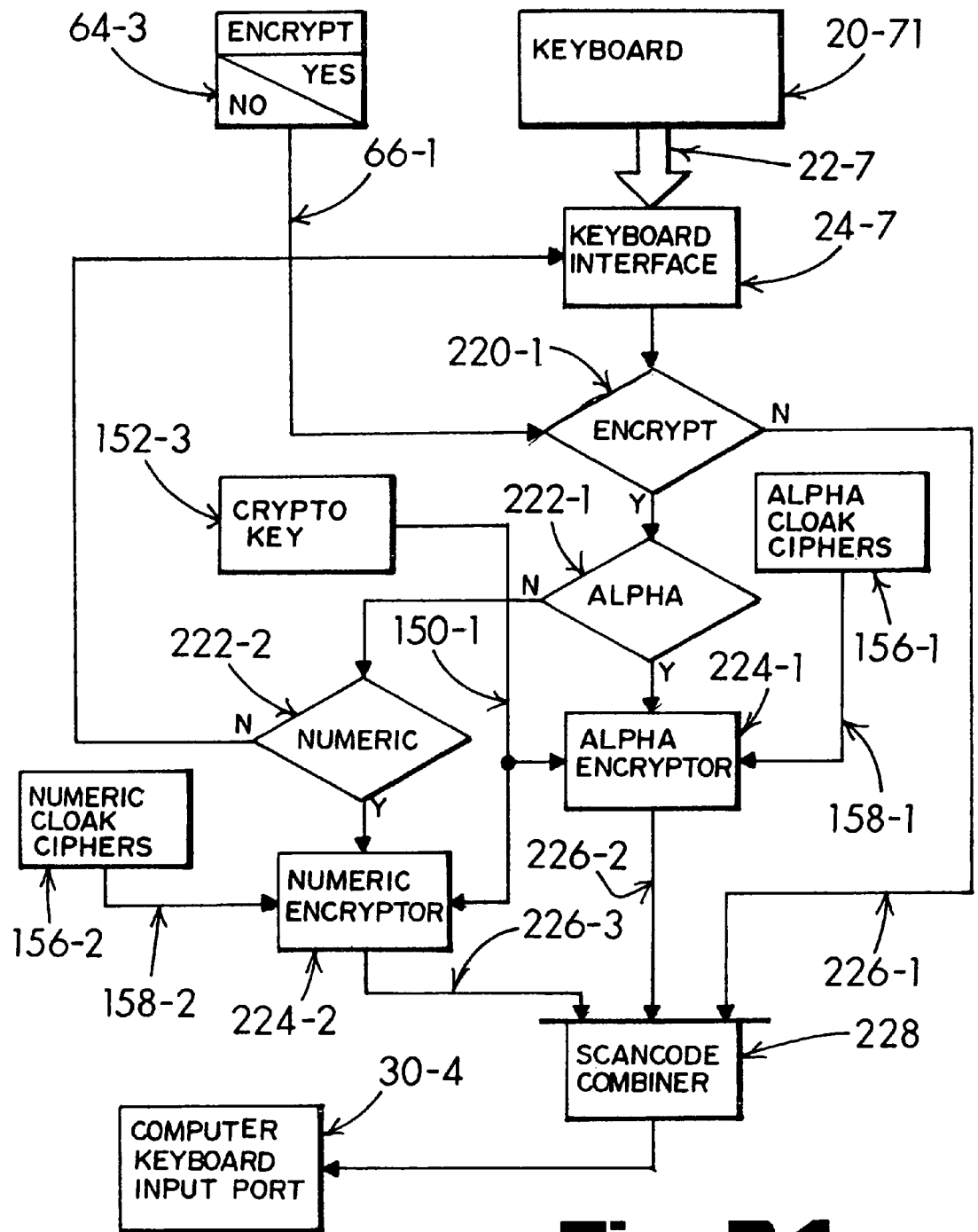
FIG. 24—Flow chart for differentiating between Alpha and Numeric text protection in order to retain the protected text format and appearance.

A flowchart depicted in FIG. 24 presents a logical approach for attaining the desired protection of the confidential entries. User-entered data submitted through the keyboard 20-71 and coupled 22-7 with a keyboard interface 24-7 couples with an ENCRYPT decisory function 220-1. The decisory capability is enabled or disabled by the user-selected ENCRYPT control entry 64-3. In event of an incoming public data signal from the keyboard interface 24-7, the (N)o output data signal line 226-1 directs the keyboard entry directly to the scan-code combiner 228. Otherwise, upon keyboarded entry 20-71 of private or confidential text, the decisory function 220-1 directs the (Y)es output and the keyboard scan-code signal to the ALPHA decisory function 222-1. If the incoming data signal is alpha text characters, the scan-code data couples from the (Y)es data signal output to the alpha-encryptor 224-1 which utilizes alpha cloak ciphers held in memory 156-1 to effectuate enciphering of the scan-code data signal conveyed 226-2 to the scan-code combiner 228. Otherwise, if the incoming scan-code data signal entering the function 222-1 are non-alpha characters, they are conveyed from the (N)o data signal output to the numeric decisory function 222-2. If the incoming scan-code signal is numerical data, the scan-code couples from the (Y)es data signal output to the numeric encryptor to utilize the numeric cloak ciphers 156-2 to deliver enciphered numerical scan-code data signals 226-3 to the scan-code combiner 228. It is the object of the scan-code combiner to receive whichever input signal 226-1, 226-2 and 226-3 that is immediately active as a selectively encrypted scan-code data signal to the keyboard data signal input port of the computer 30-4. Otherwise, the (N)o output returns to the keyboard interface 24-7 awaiting further input.

Figure 25:
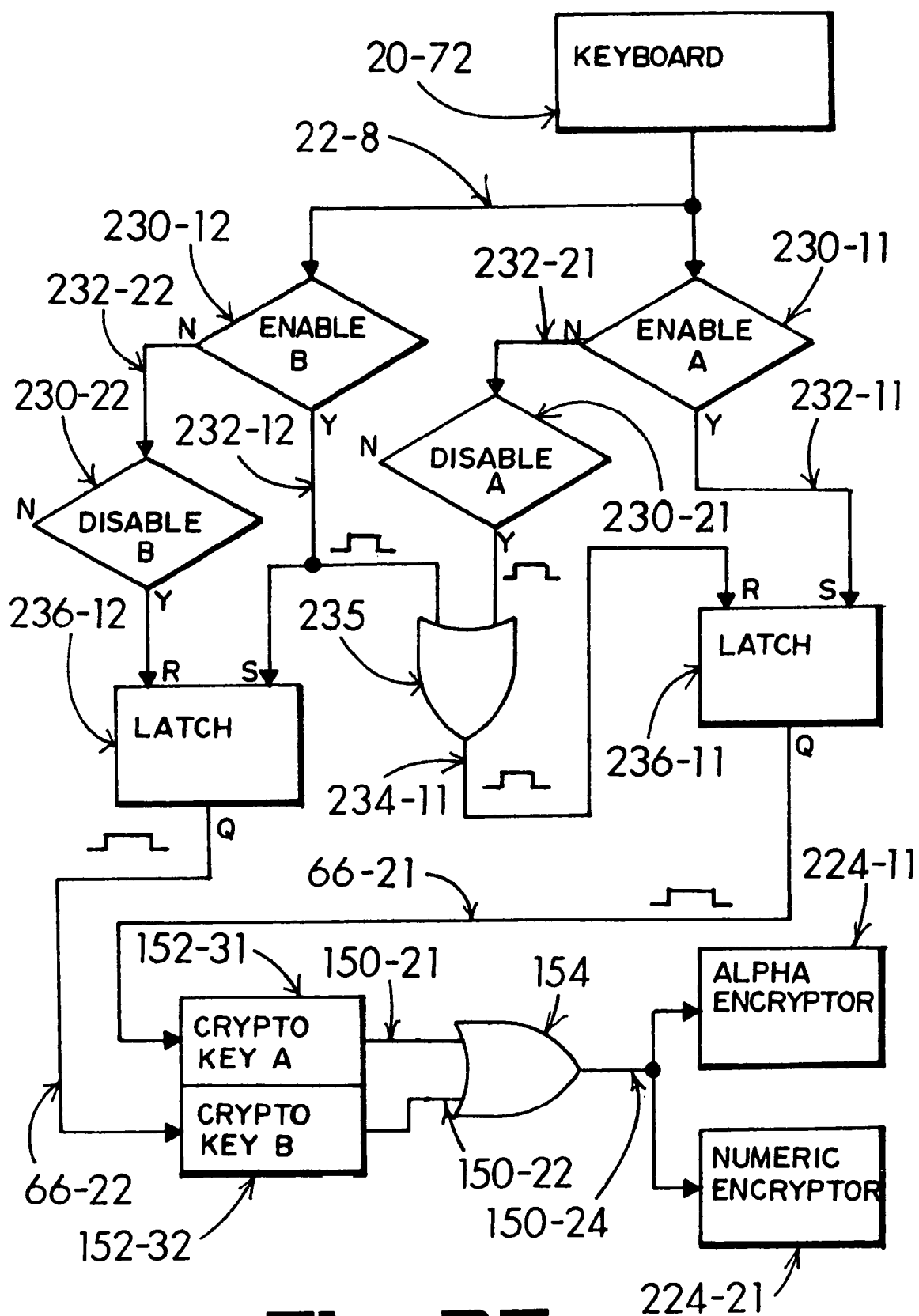
FIG. 25—Flowchart utilizing keyboard based command device to signal enablement or disablement of encryption functions.

The user selected ENCRYPT control entry 64-3 of FIG. 24 may be supplanted by a keyboard submitted command entry likely piggybacked on the scan-code data stream ushering forth from the keyboard 20-72 as presently depicted in FIG. 25. This scan-code data stream 22-8 may include an aggregation of private and public text data, together with an "enable" crypto-control command entry uniquely submitted through the keyboard. If the keyboard crypto-control entry is an "ENABLE-A" command, then the decisory function 230-11 delivers a (Y)es data signal on line 232-11 coupled with the (S)et input of a latch 236-11, resulting in an enablement signal 66-21 from the (Q) output that couples with and enables the CRYPTO KEY-A memory to deliver crypto key data 150-21 to an OR gate 154 and thence with the ALPHA encryptor 224-11 or NUMERIC encryptor 224-21 the functioning of which are described more surely in the teaching relative with FIG. 25. On the other hand, if the keyboard crypto-control entry is a "DISABLE-A" command, then the decisory function 230-11 yields a (N)o data signal 232-21 that develops a DISABLE-A signal in the function 230-21 as coupled with an input of an OR gate 235, therefrom delivering a data signal to the (R)eset input of the latch 236-11, disabling the (Q) output signal 66-21.

If the keyboard enablement entry is "ENABLE-B" command, then the decisory function 230-12 delivers a (Y)es signal on line 232-12 coupled with the remaining OR gate 235 input and a (S)et input of a latch 236-12, resulting in an enablement signal 66-22 from the (Q) output that couples with and enables the CRYPTO KEY-B memory to deliver crypto key data 150-22 to the OR gate 154 and thence with the ALPHA ENCRYPTOR 224-11 and NUMERIC ENCRYPTOR 224-21 which serve functions similar to the encryptors 224-1 and 224-2 of FIG. 24. Otherwise, if the keyboard crypto-control entry is a "DISABLE-B" command, then the decisory function 230-12 yields a (N)o signal 232-22 that develops a DISABLE-B signal in the function 230-22 as coupled with another input of the OR gate 235, further delivering a signal to the (R)eset input of the latch 236-11, disabling the (Q) output signal 66-21.

Figure 26:
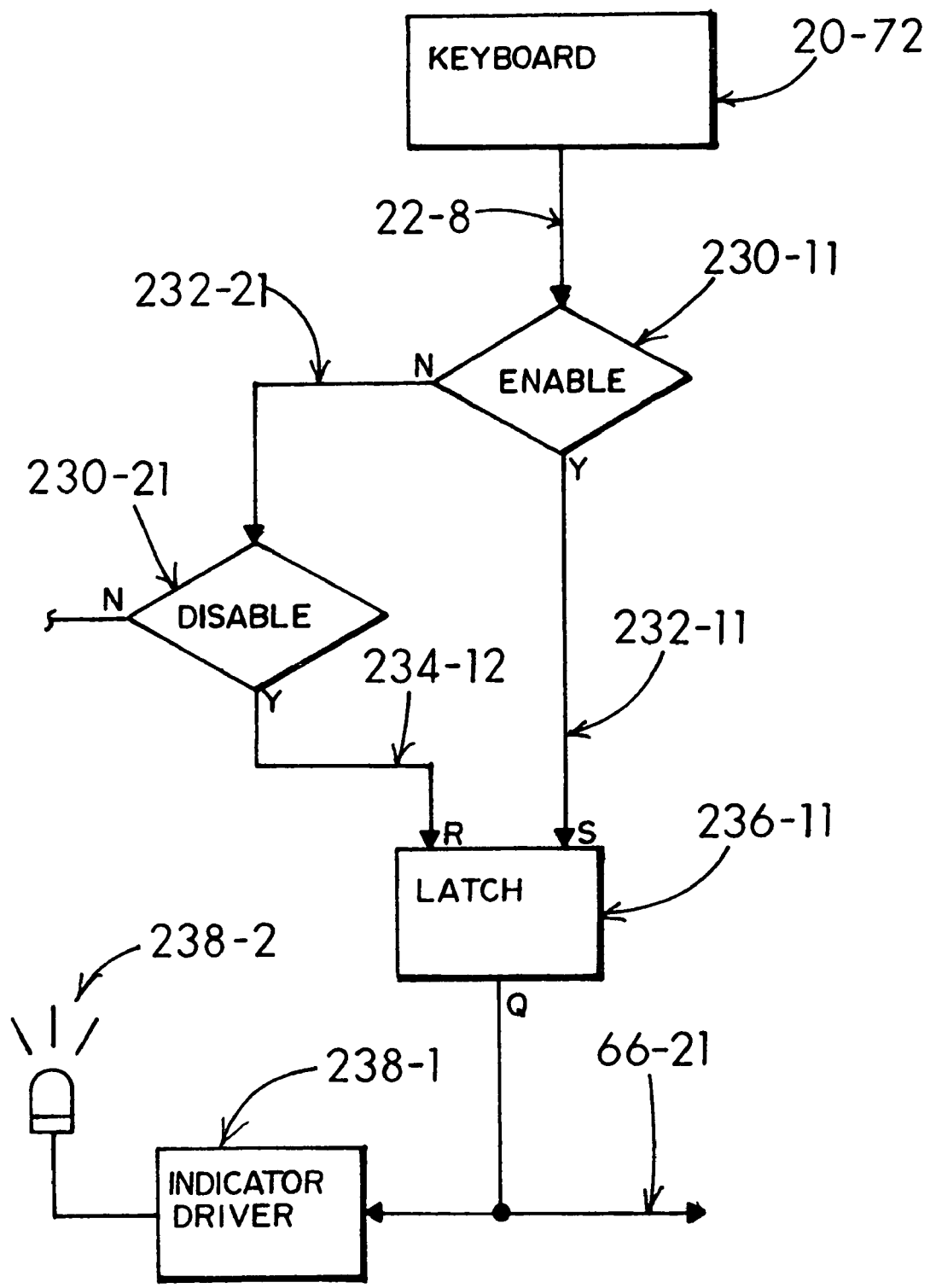
FIG. 26—Inclusion of a "encryption" telltale signal with showing of FIG. 25.

The limn of FIG. 26 shows the keyboard scan-code data signal 22-8 coupled with the ENABLE-A decisory function 230-11 operationally equivalent with the like function 230-11 of FIG. 25. As shown a keyboard command signal favorable to the ENABLE-A decisory function 230-11 delivers a (Y)es signal 232-11 to the (S)et input of a latch 236-1 to produce a (Q) output 66-21 that aside from selecting the CRYPTO KEY-A memory 152-31 of FIG. 25 also couples with an indicator driver 238-1 which actuates a telltale giving indication to the user when encryption is active.

Figure 27:
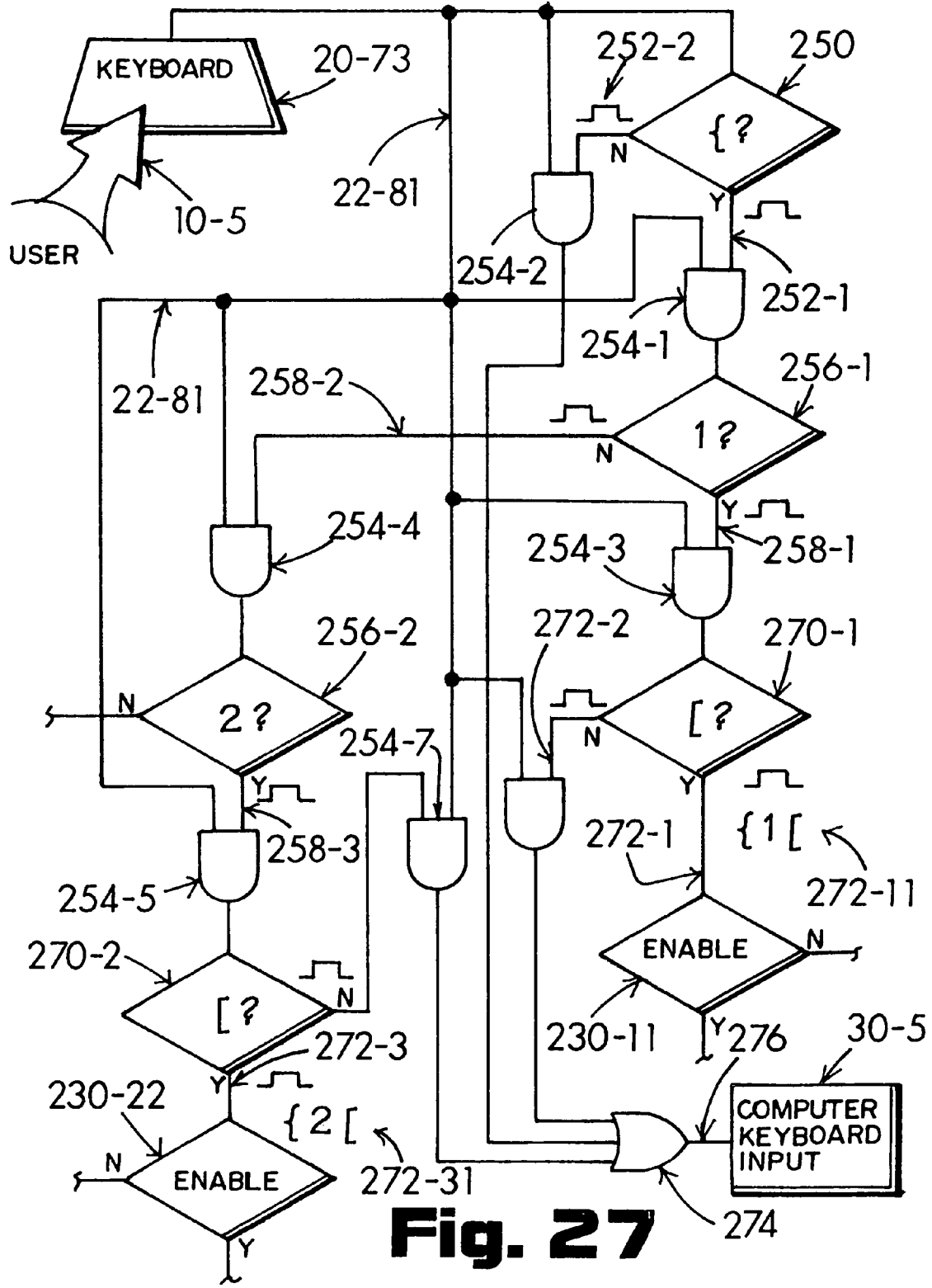
FIG. 27—Utilizing keyboard initiated commands such as "{1[" to initiate encryption.
Figure 28A:
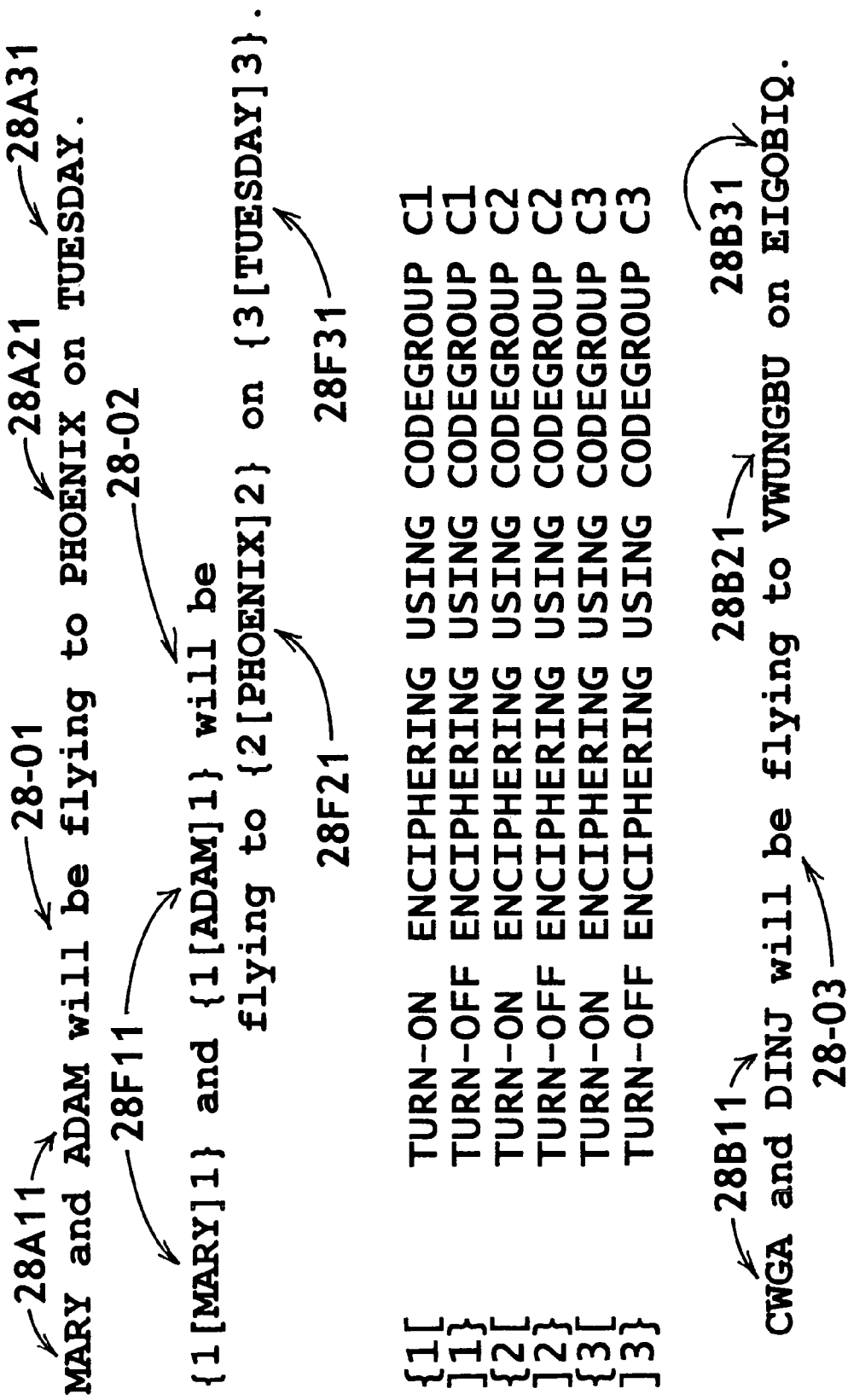
FIG. 28A—Turning encryption ON and OFF using keyboard commands.

The showings of FIG. 27 combined with FIG. 28A teach on-the-fly shifting between at least two sets of cloaking characters while keyboarding plain text information containing public and two levels of private information. Shown for example in FIG. 28A the sentence 28-01 may contain several different levels of private information. In this example "MARY" and "ADAM" represents one code-group level C1 while PHOENIX may be a second code-group level C2 and "TUESDAY" may be a third code-group level C3. As depicted, the names "MARY" and "ADAM" may be typed-in as shown in the example 28-02 to include the several "first level punctuation" characters, e.g. "{1[" and "]1}" depicted as 28F11 while the second security level of "PHOENIX" may be typed in to include the several "second level punctuation" characters, e.g. "{2[" and "]2}". A resultant encryption that occurs will convert the plain-text sentence into a protected sentence 28-03 with "MARY" and "ADAM" changed to "CWGA" and "DINJ". In this showing, it shall be realized that the encryption is enabled by the precursory sequence "{1[" and disabled by the postcursory sequence "]1}" (for the code-group level C1).

Figure 28B:
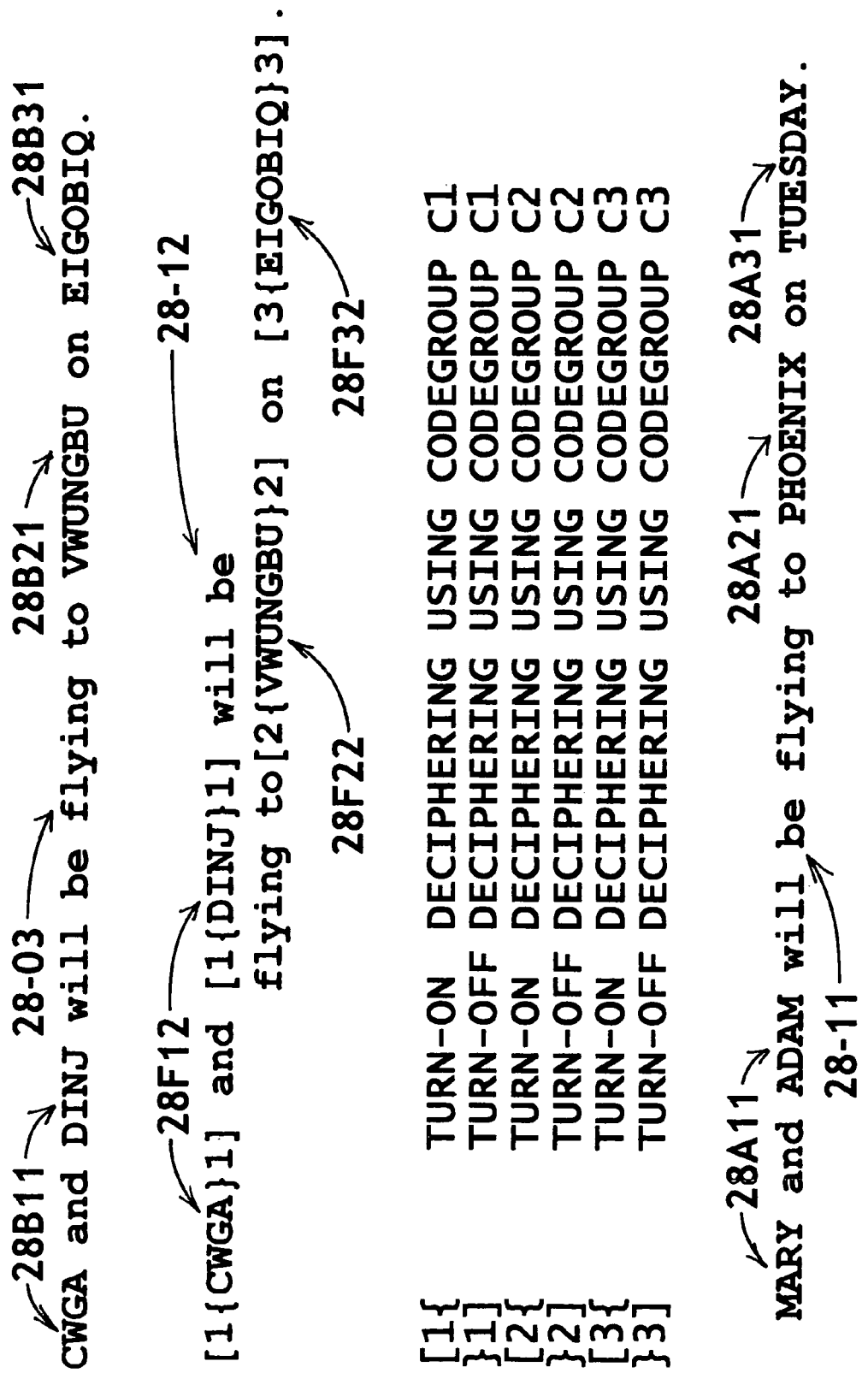
FIG. 28B—Miming decryption ON and OFF using keyboard commands.

A recovery of the encrypted names and words is depicted in FIG. 28B when the encryptor has been reconfigured as a decryptor, as discussed relative with earlier FIG. 4. In this showing the enciphered text "CWGA" and "DINJ" 28B11 of the protected sentence 28-03 is keyboarded into the decryptor 60-3 intersituated between the keyboard and the keyboard data signal input of the secure computer 30-11. The enciphered portions of the keyboard entry is enclosed by the precursory flag "[1{" and the postcursory flag "}1]". It shall be noted that the sequence of the flag component's order differs to tag encryption with "{1[" and decryption with "[1{". This is an useful example for accomplishing mode discrimination and by no way shall be considered limiting or restrictive in the overall teaching of this invention.

The enciphered text is ordinarily undecernible to the user as it is being typed in and as it appears on the screen of the display 50. As a result, typing errors (aka, "typos") may go unrealized and thence affect the accuracy or meaning of the subsequently deciphered text. For example, the name "Ted" might be inadvertently typed in as "Yrf" if the left-hand fingers were to be accidentally displaced to the right by merely one keybutton. When the name is selected for encryption, the subsequently cloaked name might erroneously appear as "Cgm" using "DOG" as the crypto-key. Thus the mistyped text "Yrf" would likely go unnoticed by the user.

Figure 29:
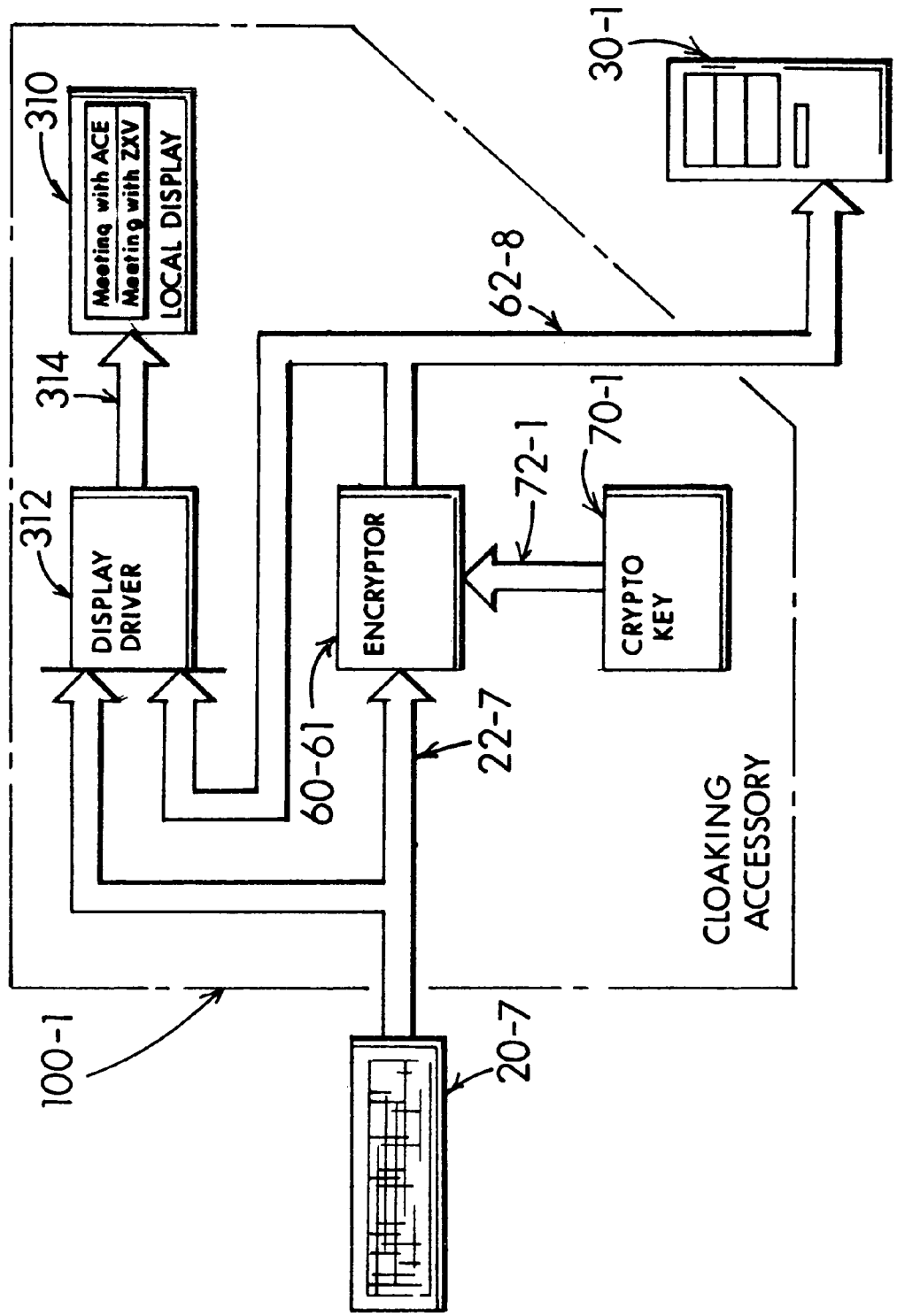
FIG. 29—A cloaking accessory providing a real-time monitor of pre-encrypted text for user to establish a real-time typing accuracy check.

In the limn of FIG. 29 the original raw keyboard scan-code data signal 22-7 is shown to be routed to a display driver 312, along with the privatized scan-code data signal 62-8. The display driver functions to convert the scan-code data signal into display character data coupled with the local display 310. In this given example, the upper line of the display 310 reads: "Meeting with ACE" that being the actual keyboarded scan-code entry 22-7 coupled with the encryptor 60-61. At the same time, the lower row shows "Meeting with ZXV" where "ZXV" is the selectively encrypted private content scan-code 62-8 coupling with the unsecure computer 30-1.

A wireless LAN or WAN a public exposure of wireless data exchange 330 between the LAN wireless linkers 320, 340 is shown to occur in FIG. 30. In the exchange of the keyboarded scan-code data content 22-1 containing private portions, the selective encryption of the private words, phrases, names or sentences can be guardedly coupled between the keyboard 20-1 and an unsecure computer 30-3 using the essence of this invention. The showing depicts an elemental arrangement in which an encryptor 60-62 enciphers the keyboard scan-code data signal 22-1 into a privatized scan-code data signal 62-9 that couples with the wireless LAN linker 320 and antenna 332-1. A companion antenna 332-2 and wireless LAN linker 340 receives the privatized scan-code data signal for coupling 342 with the unsecure computer 30-3. Note that the computer 30-3 may be particularly unsecure in view of being coupled 344 with a WAN 346 that may include internet service and an exposure to a variety of nefarious malware 348 including spybots, spyware, storage hackers and forensic adware trackers. Such malware is known to include key-entry trackers, virus, worms and other privacy invading spamware. Clearly this is no environment to entrust private text entries through the keyboard 20-1 unless at least encrypted by this invention's showings.

Flexibility for this invention to work-with a wide variety of keyboard and computer combinations is shown in FIG. 31 to include the keyboard 20-1 scan-code data signal coupled 22-1 with the encryptor 60-7 that conveys the privatized (protected) scan-code data signal 62-4 to the unsecure computer 30-1. The keyboard 20-1 may be any one of a variety of keyboard adaptations producing variants in scan-code data signals 22-1 that are compatible with the unsecure computer 30-1. In order to provide the encryption adapter 100 as a flexible device being compatible with a large number of variant combinations, a selector provision 356 is provided to enable the user to pick from a range of crypto-codes 350. For example, crypto-code 352-1 may recognize the IBM/Microsoft scan-code "Set 1" or else the scan-code 352-2 "Set 2." Other variants may be include a number of "proprietary" keyboard scan-code 352-4, 354, 352-8, 352-9 information may service other "proprietary computer systems." The inherent capability for being endowed to work with a diversity of keyboard, computer and software combinations delivered by IBM, Apple, Sun and other "compatible" or "workalike" computer systems allows for obvious use with a variety of operating systems including nearly any version of Windows™, Apple (Mac OS-X™), Solaris™ and Linux.

Practice Caveats

A reasonable and comprehensive effort has been made to explain this invention in a manner which enables a person of quite ordinary skill in the art to efficiently duplicate these findings. The utter essence of the invention is to selectively protect a keyboarded source document's private text portions of a raw keyboard data output signal before it is admitted to a keyboard data signal input port of a computer system. Otherwise, public text may remain deselected and unprotected with direct linking to the unsecure computer without encryption. The invention remarkably teaches how the private text content of a mixed private and public content document may alone be selected "on the fly" and uniquely cloaked in-situ by an encryptor intersituated in the keyboard data signal linking with the computer so as to be unreadable if intercepted or otherwise discovered. While the inventions primary teaching intendedly discusses selective protection of private text portions while allowing public text portions to remain unprotected, this is by no way to be construed limiting so as to prevent the user from cloaking the source document's entire content.

It is fully expected that a skilled artisan may develop alternate details for the invention's implementation including a considerable variation regarding physical form details, electronic data-signal inter-coupling, connection interface, signal transmutations, software and firmware configuration, encryption techniques and obvious operational preferences. These variants naturally occur as an obvious outspread from the invention's central novelty and practicable examples. Such variants ordinarily result from mere applied engineering skill coupled with an ever-increasing plethora of options regarding functional elements, techniques, encryption art, cloaking schemes and programming skills which may be utilized to duplicate or imitate the invention's contribution to the art-field.

Any attempt by another to circumvent the essence of the invention to utilize an encipherer intersituated between a keyboard's raw data signal output and the keyboard data signal input of an ordinary computer shall be prudently viewed with caution and suspicion. This prudence shall include the teaching's adaptation of raw keyboard data signal encryption to spoil a likelihood for loss of private information to nefarious interception or by residual files straying into the wrong hands. It shall be realized that hindsight cleverness may suggest other physical and technical embodiments and systematic expressions exhibiting a difference in operational detail from that which is specifically depicted to become readily apparent to and subsequently tried by others. As a consequence to this realization, all methodic practices, technical hookups, signal processing and physical embodiment variations irrespective of their extent are merely natural and obvious extensions of the invention's central teachings, insofar as they satisfy the described functionality intent of the invention. In particular this includes utilizing selectable cloaking of private text information intermixed with public text. Any scheme which satisfies this objective of the invention shall be found as merely obvious modifications of or extensions to the rudiments of the invention's fundamental teachings. Obvious engineering refinements, embodiment practices and operational details shall be construed to be irrefutably within the scope of the invention as presently taught and inclusively claimed.

I claim for my invention:

1. Keyboard data entry obfuscation method, comprising:
   keyboarding entry of a mixed-content document to produce an aggregate signal combination of private text characters and public text characters to yield a keyboard data signal;
   intersituating an encryptor apparatus in the keyboard data signal path connecting between the entry keyboard and a keyboard input port of a computer system;
   determining an encryption key that is maintained separate from the computer system;
   operating the encryptor apparatus in combination with the encryption key;
   enabling a user to select and cloak the private text character signal content of the aggregate signal combination with surrogate characters selected from an ostensibly random criterion array of keyboard enterable characters; and,
   connecting the combined signal aggregation of the surrogate characters and the public text characters to the keyboard input port of the computer system as a protected document data signal;
   whereby the private text characters selected by the user are cloaked with surrogate characters determined by the encryption key before the keyboard data signal is connected into the keyboard input port on the computer system.

2. The keyboard data entry obfuscation method of claim 1, comprising:
   keyboarding an entry of a viewable rendering of the protected document data signal including the public text character content and the surrogate cloak character content to yield the keyboard data signal;
   intersituating a decryptor apparatus in the keyboard data signal path connection between the entry keyboard and the keyboard input port on a preferably secure computer system;
   determining a decryption key that is maintained separate from the computer system;
   operating the decryptor apparatus in combination with the decryption key; and,
   selecting and decrypting the cloak character portions of the keyboard data signal with replacement characters selected from the ostensibly random criterion array in alternation with the unencrypted public text character data content;

whereby the decryptor apparatus utilizes the decryption key to recover the encrypted private text character portion of the keyboarded entry of the protected document to effectuate a replication of the mixed-content document.

3. The keyboard data entry obfuscation method of claim 2 comprising:

handling the protected document data signal as a protected document data file in the computer system;

editing the protected document data file content utilizing application software ordinarily included in the computer system;

visibly rendering an edited version of the protected document data file;

and subsequently, and, subsequently keyboarding entry of the visible rendering of the edited version of the protected document data file including the public text character content and the cloak characters representing the encrypted private text portions to yield the keyboard data signal.

4. The keyboard data entry obfuscation method of claim 1 further comprising:

characterizing separate portions of the private text content with at least two separate levels of privacy;

first excerpting a first level of private text character content;

utilizing a first encryption key to encrypt the first excerpted private text characters with a substitution of cloak characters selected from a first level criterion array of ostensibly random cloak characters;

second excerpting a second-level selection of private text character content; and, utilizing a second encryption key to encrypt the second excerpted private text characters with a substitution of cloak characters selected from a second level criterion array of ostensibly random cloak characters;

whereby at least a first level and a second level of encryption avail recipient users to different levels of authorization.

5. The keyboard data entry obfuscation method of claim 2 comprising:

assigning a unique device identification code (DIC) value to the intersituated encryptor apparatus;

offsetting the cloak character encryption to an extent determined by a combination of the encryption key and the unique DIC value; and, subsequently decrypting the offset cloak characters utilizing the decryption key with the same encryptor apparatus and unique DIC value;

whereby an encryptor apparatus having the unique DIC value must be used for decryption that was used for original encryption.

6. The keyboard data entry obfuscation method of claim 2 comprising:

assigning a unique user identification code (UIC) value;

offsetting the cloak character encryption to an extent determined by a combination of the encryption key and the unique UIC value;

subsequently decrypting the offset cloak characters by a user utilizing the decryption key in combination with the unique UIC value;

whereby an user must use the same unique UIC value for decryption that was used for original encryption.

7. The keyboard data entry obfuscation method of claim 1 comprising:

supplanting the alpha-numerical cloak characters with like characters, including:

encrypting private text alpha characters A through Z with alpha cloak characters; and, encrypting private text numeric characters 0 through 9 with numeric cloak characters;

whereby the cloak characters retain a like character appearance of the mixed content document.

8. The keyboard data entry obfuscation method of claim 1 comprising:

purging the keyboarded private text content and a crypto-key from the encryptor apparatus memory provisions upon finding at least one condition of:

intentional cancellation of a keyboarding session;

completion of the keyboarding session containing the private text content;

detecting an improper usage of the encryptor apparatus including at least one event of:

attempted usage by an unauthorized party;

attempted usage outside a predetermined time window;

attempted usage with an improper private crypto-key or password;

expiration of a predetermined period of inactivity;

expiration of the private crypto-key or password;

disconnection from at least one of the keyboard data signal output port and the keyboard input port of the computer system; and, power failure;

whereby the encryptor apparatus memory provisions are purged free of residual data retention upon sensing at least one of a number of disallowed events in addition to concluding a work session or removing power.

9. Keyboard character entry obfuscation method for a computer system comprising:

keyboarding a mixed-content document including an aggregation of private text characters and public text characters to produce a keyboard data signal;

intersituating an encoder apparatus in the keyboard data signal path ordinarily connecting the keyboard output signal with the keyboard data signal input port of the computer system;

predetermining an ostensibly random cloak character array of keyboard enterable surrogate characters;

utilizing a crypto key to enable the encoder apparatus to obfuscate a user selection of the private text character content of the keyboarded mixed-content document with the surrogate characters selected from the ostensibly random cloak character array;

disenabling the encoder apparatus concurrent with the keyboarding of the public text character content;

composing a protected document keyboard data signal including an aggregation of the public text character content and the surrogate characters; and, coupling the protected document keyboard signal output into the keyboard signal input port of the computer system.

10. The keyboard character entry obfuscation method of claim 9 comprising:

composing a prime crypto-key value to include a number of crypto-key characters;

developing individual prime crypto-key characters into unique numerical cipher-offset values determined by their absolute position in a criterion array of available crypto-key characters; and, selecting the encoded cloak characters to include an additional offset as determined by the unique numerical cipher-offset value.

11. The keyboard character entry obfuscation method of claim 10 including at least one of:
   assigning a unique Device Identification Code (DIC) to the encoder apparatus which combines with the cipher offset values to confound deciphering of the cloaking characters on an unauthorized decryption apparatus;
   assigning an authorized User Identification Code (UIC) which combines with the cipher offset values to confound deciphering of the cloaking characters by an unauthorized user or UIC; and,
   assigning an Allowed Time-window Code (ATC) which combines with the cipher offset values to confound deciphering of the cloaking characters at any time outside of an authorized time-window;
   whereby restrictions on unattended use of the encoder apparatus by requiring an additional identification code factor and preferably during the authorized time-window serves to thwart clandestine attempts to violate the cloaking character security.

12. The keyboard character entry obfuscation method of claim 9 comprising:
   supplanting the private text characters with like character surrogates, including:
      encrypting private text alpha characters A through Z with alpha cloak characters; and,
      encrypting private text numeric characters θ through 9 with numeric cloak characters; and,
   whereby the alpha-numerical cloak characters retain a like character style and formatting.

13. The keyboard character entry obfuscation method of claim 9 including:
   displaying a textual admix of the public text content and the cloak characters in an applications program including one of a word processor, data base manager, spread sheet, browser, email handler and a print manager,
   whereby the displayed applications program information, including the surrogate cloak characters, are further handled by at least one of viewing, formatting, composing, positioning, content editing, filing and being otherwise processed without compromising the security or gist of the private text content guarded by the cloak characters.

14. The keyboard character entry obfuscation method of claim 9 comprising:
   selecting a substitution of the ostensibly random surrogate cloak characters for the characters composing the private text content concurrent with the keyboarding of the private text content;
   implementing the substitution to preferably occur in the encoder apparatus intersituated between the keyboard signal output and the computer system's keyboard signal input port; and,
   alternatively selecting a coupling of the public text content directly with the computer system's keyboard signal input port;
   whereby the private text content is masked by cloak-characters to forestall inadvertent or intentional compromise of the private text content.

15. Keyboard data obfuscation method for producing a protected document, comprising:
   intersituating an encryptor apparatus in the keyboard signal link between a keyboard and a computer system;
   keyboarding a mixed-content document including an aggregation of private text characters and public text characters to deliver a keyboard signal;
   determining an encryption cipher key held separate from the computer system;
   predetermining a randomly shuffled criterion array of keyboard enterable cloak characters;
   selecting the private text characters and enabling a combination of the encryption cipher key and the encryptor apparatus to substitute a succession of the cloak characters selected from the criterion array of cloak characters as surrogates for the private text characters;
   passing the public text characters directly through the encryptor apparatus with impunity; and,
   aggregating the surrogate cloak characters and the public text characters into a keyboard signal coupling into a keyboard input port of the computer system;
   whereby the cloak characters appear as the surrogates for the private text characters preceding the connection with the keyboard input port of the computer system.

16. The keyboard data obfuscation method of claim 15 comprising:
   reconfiguring the encryptor apparatus as a decryptor apparatus in the keyboard signal link connected between the keyboard and the keyboard input port of a preferably secure computer system;
   the keyboarding of a mixed-content document to produce a keyboard signal including an aggregation of the surrogated cloak characters and the public text characters;
   determining a decryption cipher key held separate from the computer system;
   operating the decryptor apparatus in combination with the decryption key and the criterion array of cloak characters;
   selecting the surrogate cloak characters and enabling a combination of the decryption cipher key and the decryptor apparatus to replace the cloak characters with alternate characters which restore meaning to the private text content; and,
   the passing of non-substitute public text characters directly through the decryptor apparatus with impunity;
   whereby a plain-text replication of the original mixed-content document is restored.

17. The keyboard data obfuscation method of claim 15 comprising:
   coupling the computer system with a cloud computing environment;
   exchanging the aggregation of the surrogate cloak characters and the public text characters with the cloud computing environment;
   maintaining the encryption cipher key holding separate from exchange with the cloud computing environment;
   decrypting the surrogate cloak characters in combination with a decryption cipher key subsequent to a return from the cloud computing environment;
   whereby the encryption cipher key, the decryption cipher key and the private text characters are maintained separate and effectively isolated from the cloud computing environment.

18. The keyboard data obfuscation method of claim 15 comprising:
   confining the criterion array to include a shuffled 52 character alphabetic reference-series of 26 uppercase and 26 lowercase characters;
   utilizing the alphabetic reference-series for cloaking the selected private text alphabetical like characters;

extending the criterion array to include a shuffled numerical reference-series of 10 numeric values between 0 and 9; and, utilizing the numerical reference-series for cloaking of the selected private text numerical like characters.

19. The keyboard data obfuscation method of claim 15 comprising:

determining at least one of a device identification code (DIC) and an authorized user identification code (UIC) usable in combination with the encryption cipher key and the intersituated encryptor apparatus;

restricting encryption and subsequent decryption to the same encryptor apparatus having the assigned DIC; and, restricting the encryption and the subsequent decryption to the same authorized user having the assigned UIC;

whereby decryption is restricted to at least one of the same encryptor apparatus, decryption cipher key and the same user.

20. The keyboard data obfuscation method of claim 15 comprising:

operating the computer system as a virtual desktop computer in conjunction with a "cloud computing" environment;

restricting the randomly shuffled reference series of cloak characters from coupling into the cloud computing environment;

enabling the protected document to efficaciously couple with the cloud computing environment for at least one function of storage, transmittal and editing;

returning a version of the protected document to the virtual desktop computer from the cloud computing environment;

outputting the returned version of the protected document as a viewable rendering;

intersituating a decryptor apparatus in the keyboard signal path connecting between the keyboard and an usually secure computer system;

keyboarding the viewable rendering into the usually secure computer system as the aggregation of the cloak-characters and the public text characters to deliver the keyboard signal;

operating the decryptor apparatus in conjunction with the criterion array to replace the cloak characters with alternate characters which reveal the private text character content; and, replicating the original mixed-content document.

* * * * *